United States Patent [19]

Bullis

[11] Patent Number: 5,220,668
[45] Date of Patent: Jun. 15, 1993

[54] DIGITAL DATA PROCESSOR WITH MAINTENANCE AND DIAGNOSTIC SYSTEM

[75] Inventor: Charles A. Bullis, San Jose, Calif.

[73] Assignee: Stratus Computer, Inc., Mass.

[21] Appl. No.: 723,065

[22] Filed: Jun. 28, 1991

Related U.S. Application Data

[63] Continuation-in-part of Ser. No. 659,597, Feb. 21, 1991, abandoned, which is a continuation of Ser. No. 586,547, Sep. 21, 1990, abandoned.

[51] Int. Cl.⁵ .............................................. G06F 11/00
[52] U.S. Cl. ............................ 395/650; 364/DIG. 1; 364/285.3; 364/268.9; 364/267.2
[58] Field of Search .................. 364/DIG. 1 MS File, 364/DIG. 2 MS File; 395/650; 371/16.5, 48

[56] References Cited

U.S. PATENT DOCUMENTS

| | | | |
|---|---|---|---|
| 4,486,826 | 12/1984 | Wolff et al. | 364/200 |
| 4,648,031 | 3/1987 | Jenner | 364/DIG. 1 |
| 4,654,857 | 3/1987 | Samson et al. | 371/68 |
| 4,816,990 | 3/1989 | Williams | 364/200 |
| 4,866,604 | 9/1989 | Reid | 364/200 |
| 4,905,181 | 2/1990 | Gregory | 364/DIG. 2 |
| 4,920,540 | 4/1990 | Baty | 371/61 |
| 4,926,315 | 5/1990 | Long et al. | 364/200 |
| 5,020,024 | 5/1991 | Williams | 264/900 |
| 5,095,421 | 3/1992 | Freund | 364/DIG. 2 |

Primary Examiner—Thomas M. Heckler
Attorney, Agent, or Firm—Lahive & Cockfield

[57] ABSTRACT

A state machine in a digital data processor in a UNIX-type operating system environment has state managers associated with the functional units of the data processor for indicating the state of the units; a message handler for, alternately, (a) generating requests for processing event messages indicative of conditions in the processor, that are awaiting processing and (b) generating a request for evaluation of one state manager's maintenance state, limited to transition from one state to another; and a scheduling means responsive to requests from the message handler for selectively processing the event messages, to the passage of time, and to changes of state of state managers, and for scheduling evaluation of a state manager's maintenance state. The scheduling means schedules evaluation of respective state manager's maintenance states according to a priority determined by (a) dependencies between state managers, wherein one state manager is dependent on another state manager, and (b) priorities set by scheduling conditions registered by state managers. The scheduling means executes the steps of (a) evaluating a predetermined input condition, (b) selectively making a state transition in accord with that input condition and the state manager's maintenance state, and (c) selectively performing a predetermined action associated with said transition.

10 Claims, 9 Drawing Sheets

| | | |
|---|---|---|
| <STATE MANAGER> | : | <STATE MANAGER FILE> |
| <STATE MANAGER FILE> | : | (<INCLUDE>)<br>(<DEFINE>)<br><STATE VAR DEFINITIONS><br><TRANSITION RULES><br><SUBROUTINES> |
| <INCLUDE> | : | "#INCLUDE" (<CHARACTER>) <NEWLINE> |
| <DEFINE> | : | "#DEFINE" (<CHARACTER>) <NEWLINE> |
| <STATE VAR DEFINITIONS> | : | <PRIMARY VARIABLE DEF><OTHER STATE VARS> |
| <VARIABLE DEFINITIONS> | : | (<TAB>/<SPACE>) "INT STATE;" <NEWLINE> |
| <OTHER STATE VARS> | : | <ANY TEXT> |
| <TRANSITION RULES> | : | <START TRANSITION RULE> (<TRANSITION RULE>) |
| <START TRANSITION RULE> | : | <TRANS LABEL SECTION><br>"STATE:" "START"<START PARAMETERS <NEWLINE><br><ACTION SECTION> / <EMPTY><br><SCHEDULING SECTION> / <EMPTY><br><NEXT STATE SECTION> |
| <START PARAMETERS> | : | <ANY TEXT UP TO END OF LINE> |
| <TRANSITION RULE> | : | <TRANS LABEL SECTION><br><CURRENT STATE SECTION><br><INPUT SECTION> / <EMPTY><br><ACTION SECTION> / <EMPTY><br><SCHEDULING SECTION> / <EMPTY><br><NEXT STATE SECTION> |
| <TRAN LABEL SECTION> | : | "TRANSITION" <ANY TEXT UP TO END OF LINE><NEWLINE> |
| <CURRENT STATE SECTION> | : | "STATE:" <STATE VALUE><NEWLINE> |
| <STATE VALUE> | : | <UPPER CASE> (<UPPER_CASE> / <DIGIT> / "_") |
| <INPUT SECTION> | : | "I:" <ANY TEXT UP TO END OF LINE><NEWLINE><br>(<ANY TEXT UP TO END OF LINE><NEWLINE>) |
| <ACTION SECTION> | : | "A:" <ANY TEXT UP TO END OF LINE><NEWLINE><br>(<ANY TEXT UP TO END OF LINE><NEWLINE>) |
| <SCHEDULING SECTION> | : | "S:" <ANY TEXT UP TO END OF LINE><NEWLINE><br>(<ANY TEXT UP TO END OF LINE><NEWLINE>) |
| <NEXT STATE SECTION> | : | "N:" <STATE VALUE><NEWLINE> |
| <SUBROUTINES> | : | <ANY TEXT> |

*FIG. 4*

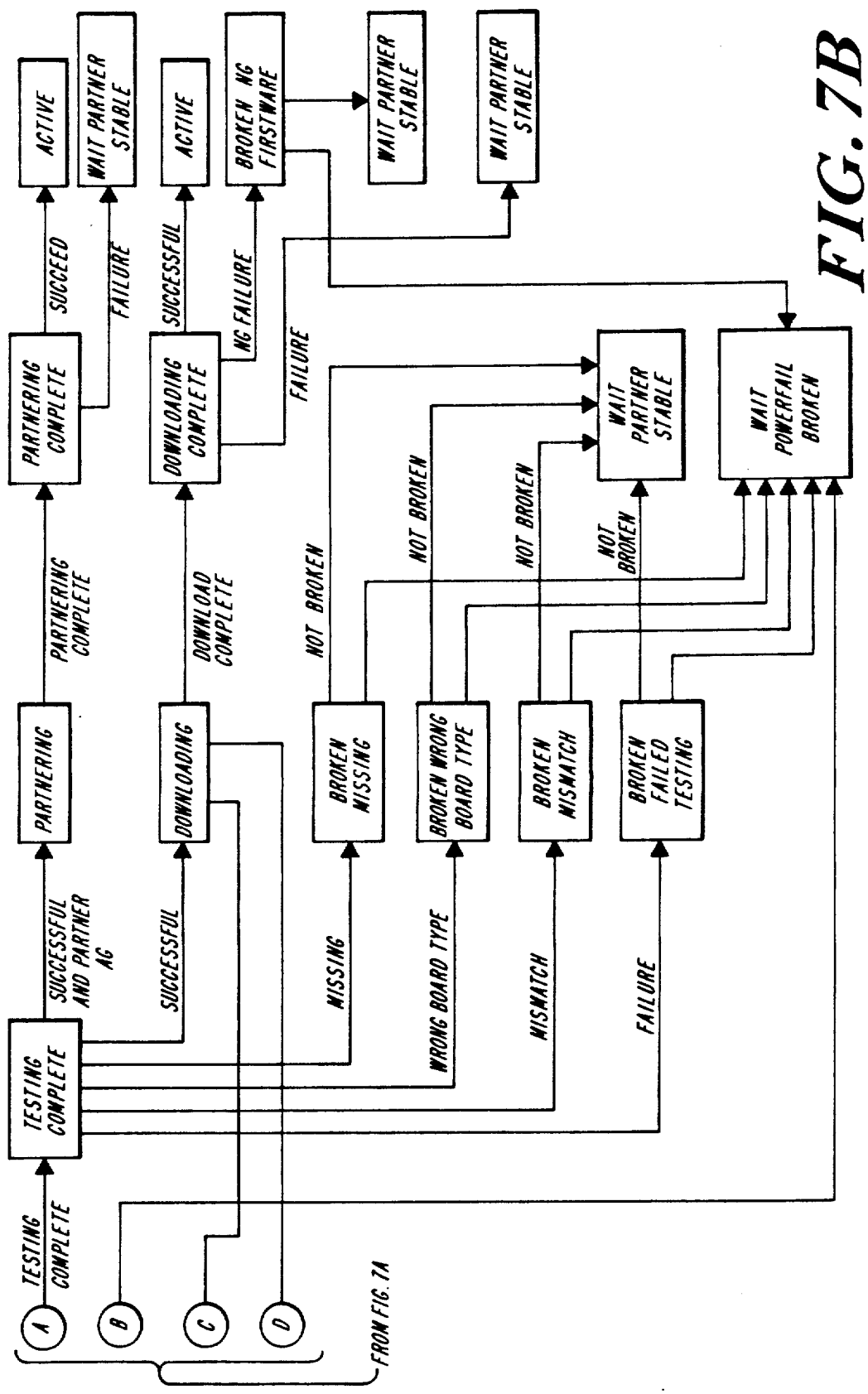

DIGITAL DATA PROCESSOR WITH MAINTENANCE AND DIAGNOSTIC SYSTEM

This application is a continuation-in-part of patent application Ser. No. 659,597, filed Feb. 21, 1991, entitled Fault-Tolerant Unit-Type Digital Date Processing Method and Apparatus, abandoned, which is a continuation of patent application Ser. No. 586,547, filed Sep. 21, 1990 abandoned.

BACKGROUND OF THE INVENTION

The invention relates to a maintenance and diagnostic system for a digital data processor, and particularly to such a system for a digital data processor of the fault-tolerant type.

Faults are inevitable in digital computer systems due to such things as the complexity of the circuits, and the associated electromechanical devices. To permit system operation even after the occurrence of a fault, the art has developed a number of fault-tolerant designs.

Improved fault-tolerant digital data processing systems, available from Stratus Computer, Inc. of Marlboro, Mass., include redundant functional units, e.g. duplicate CPU's, memories, and peripheral controllers interconnected along a common system bus. Each of a pair of functional units responds identically to input received from the bus. In the outputs of a pair of functional units do not agree, that unit is taken off-line, and another pair of functional units (a "spare") continues to function in its place.

Stratus Computer, Inc. has recently developed fault-tolerant systems that use UNIX-type operating systems, despite characteristics of UNIX systems that make them difficult to adapt to Stratus' fault-tolerant operation. The parent application of this one describes a Stratus system for overcoming the limitations of UNIX-type operating systems in the transfer of information to disk storage devices.

An important element of fault-tolerant systems is a maintenance and diagnostic system that automatically monitors the condition (or "state") of functional units of the data processing system, particularly those that are more readily replaceable ("field replaceable units" or FRU's). The complexity of fault-tolerant systems requires that such maintenance and diagnostic systems (or "state machines") have capabilities far beyond anything conventionally available.

It is accordingly an object of this invention to provide a maintenance and diagnostic system for a fault-tolerant digital data processing system that is efficient, reliable and fast. It is another object to provide such a system that will operate well in a UNIX-type operating system environment.

SUMMARY OF THE INVENTION

The invention provides, in a digital data processor of the type having processing means for processing data, including functional units operatively interconnected along a bus, such as processing units, memory assemblies, peripheral devices, peripheral device controllers and the like, a processor having a state machine for providing a maintenance state model of the digital data processor, the state machine including a plurality of state managers each associated with one of the functional units for indicating the state of those units. The processor includes event signallers coupled to the state machine for generating event messages indicative of conditions of the digital data processor, and at least one state manager is selectively responsive to the event messages, and to a state indicated by another state manager, to change the state indicated by the state manager.

In preferred embodiments the processor includes a scheduler responsive to a request for processing said event messages or for scheduling evaluation of a state manager's maintenance state. The scheduler includes means for evaluating a state manager's maintenance state by executing the steps of (a) evaluating a predetermined input condition, (b) selectively making a state transition in accord with that input condition and with the state manager's maintenance state, and (c) selectively performing a predetermined action associated with said transition. There may also be included a message handler coupled to the event signallers and to the state machine for, alternately, (a) generating requests for processing of all pending event messages and (b) generating a request for evaluation of one state manager's maintenance state, limited to transition from one state to another. Further, the scheduler is arranged to schedule evaluation of respective state manager' maintenance states according to a priority determined by (a) dependencies between state managers, wherein one state manager can mark itself dependent on another state manager, and (b) priorities set by scheduling conditions registered by state managers. Also, preferably, the state managers are configured to represent a configuration of the digital data processor, and the digital data processor may be one operating under a UNIX-type operating system.

DESCRIPTION OF THE DRAWINGS

Other objects, features and advantages of the invention will be apparent from the following description of a preferred embodiment of the invention, including the drawings thereof, of which:

FIG. 4 is a formal description of an illustrative state manager specification, referred to in Appendix B (which can be found in the application file);

BRIEF DESCRIPTION OF A PREFERRED EMBODIMENT

Figure 1A:
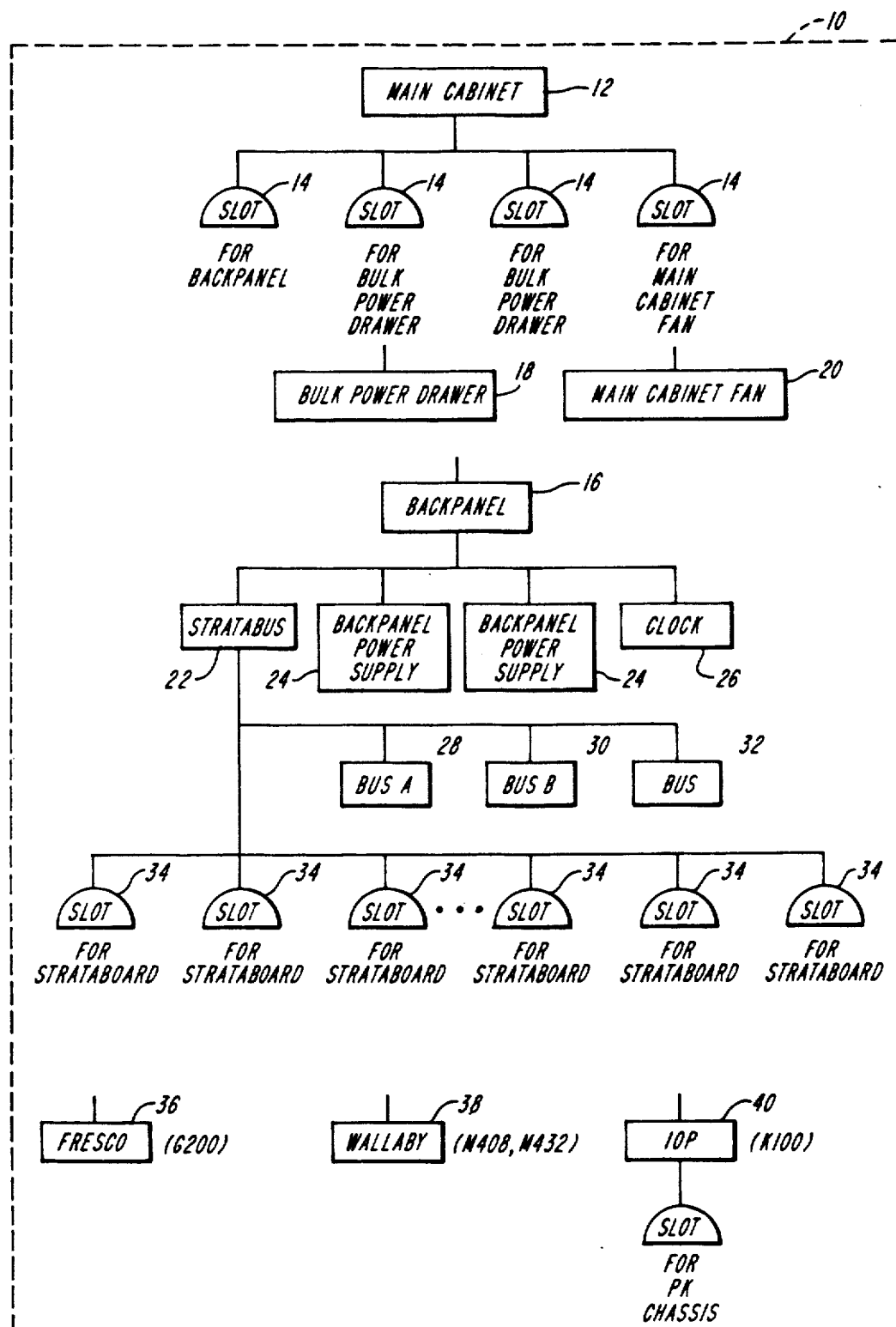
FIGS. 1A and 1B are a schematic functional representation fault-tolerant data Processor.
Figure 1B:
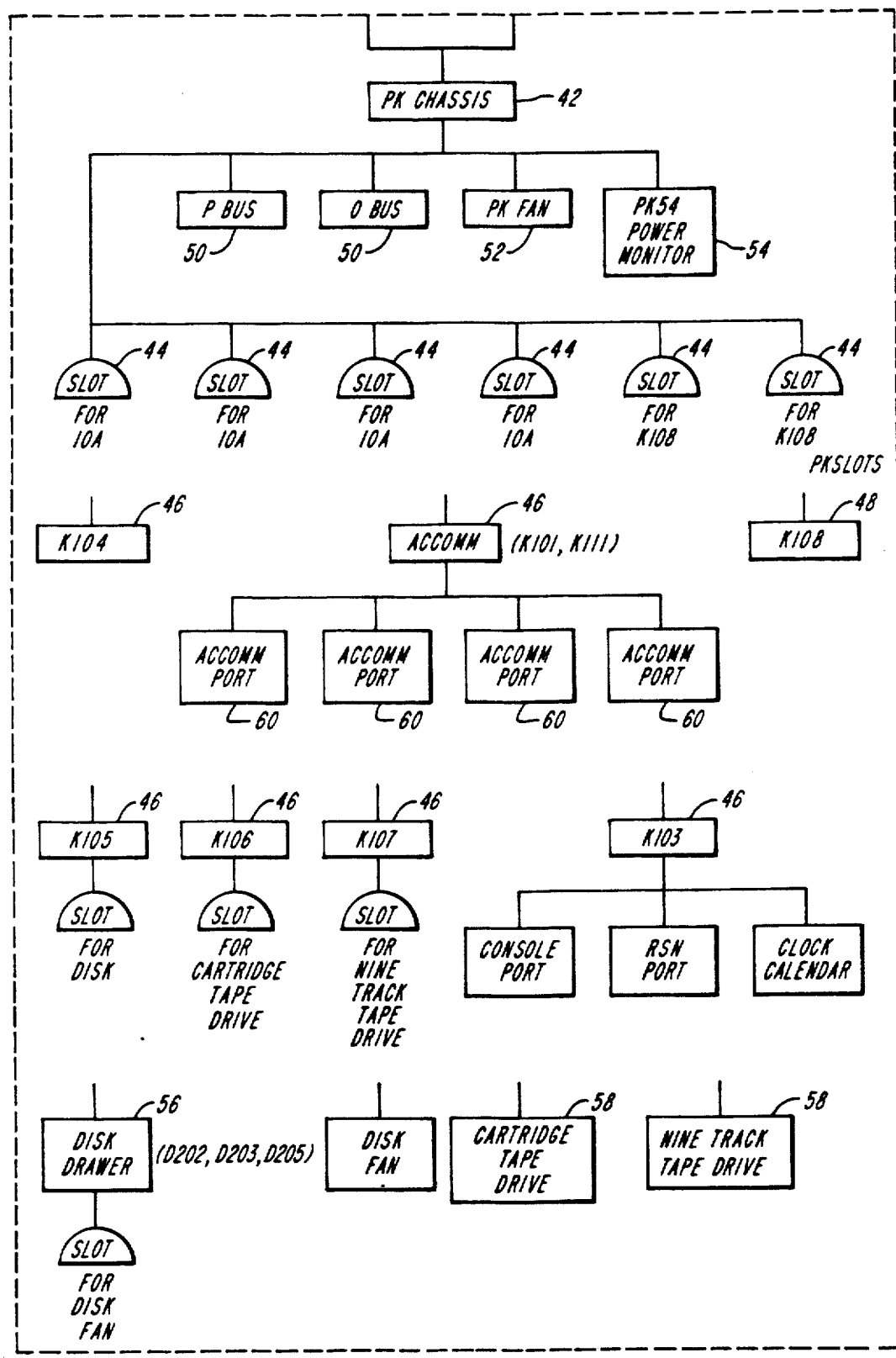
Figure 1C:
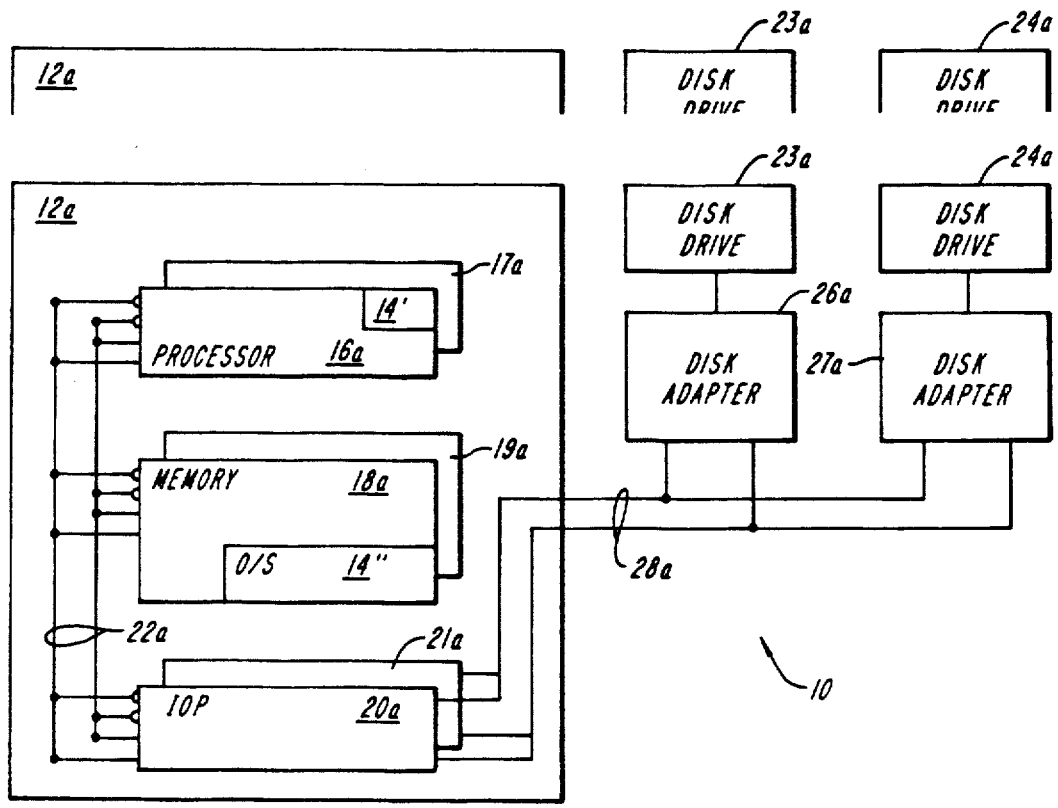
FIG. 1C is a schematic illustration of a digital data processing system.

FIG. 1C is a schematic illustration of a digital data processing system 10 of the type used in a preferred practice of the invention. The system 10 includes a processing section 12a including central processing unit 16a, random access memory unit 18a, and partnered peripheral device controllers 20a, 21a, hereinafter IOP's. Other conventional devices are also connected to the processing section 12a of the illustrated digital data processing system. A pair of disk adapters 26a, 27a and their respective disk drives 23a, 24a, are connected with the system 10 via IOP's 20a, 21a along bus structure 28a, as shown.

In the illustrated embodiment, a single common bus structure 22a interconnects the illustrated central processing, memory and controller units to carry information between them. As discussed below, the bus structure 22a preferably includes two identical bus conductor sets, termed an A bus and a B bus, respectively, which transmit the identical information signals synchronously and simultaneously between the modules of the system 10. A third, non-illustrated bus, referred to as the X bus, carries power, timing, status and fault-notification signals.

The above-described hardware components can be selected from the variety of commercially available products and configured in a manner suitable to operate a UNIX-type operating system. Preferably, the components are selected and configured in accord with the teachings of the United States patent assigned to the assignee of the present application.

Thus, for example, in accord with the teachings of U.S. Pat. No. 4,654,857, each functional unit of the system 10 has a back-up redundant partner unit. Accordingly, processing system 10 has a second central processing unit 17a, a second memory unit 19a, and a second disk control unit 21a. Each of these units, like their respective partners, is connected to the conductor sets of the bus structure 22a. This enables all units to transfer signals to one another on either the A bus and/or the B bus, as well as on the X bus.

The basic operation of the illustrated system 10 is that, in the absence of fault, the partner central processing units 16a, 17a and partner memory units 18a, 19a operate in lock-step synchronism with one another. Thus, both units drive the A bus and the B bus identically, and both are driven identically by the two buses.

The IOP's 20a, 21a do not operate in full synchronism with one another because the disk drives 26a, 27a with which they operate are not driven synchronously. During fault-free operation, each IOP 20a, 21a writes data received from the bus structure 22a to the bus 28a so that it can be stored on the disk drives 23a, 24a.

U.S. Pat. No. 4,926,315 discloses a still more preferred construction and protocol for handling communications between the processing section 12a and the disk drives 26a, 27a with which they communicate. In accord with the teachings of that patent, partnered peripheral control units transfer control information and timing signals over a dual redundant peripheral bus to partnered interface and adaptor boards, which are connected with peripheral devices, such as disk drives 23a, 24a.

The illustrated system 10 and, more particularly, processing section 12a employs an operating system that is UNIX compatible and, more particularly, one that is compatible with UNIX System V, Release 3.2 with Berkeley Software Distribution ("BSD") extensions. Such a system is referred to by Stratus Computer, Inc. as an FTX system. Those skilled in the art will appreciate that the teachings below apply, not only to the aforementioned UNIX operating system, but to a variety of UNIX-compatible operating systems. Accordingly, the operating system 14a is hereinafter referred to as a UNIX-type operating system.

As shown in FIG. 1, that operating system includes portions 14' and 14". Portion 14' represents that part of the operating system executing within the central processors 16a, 17a for controlling their operation. The other portion 14" represents that part presently resident in memories 18a, 19a, which is available for execution by the processors 16a, 17a in lieu of, or in conjunction with, portion 14'. A further portion of the operating system may be resident on secondary storage media, e.g., disk drives 23a, 24a. The exchange of information between these portions is handled in a manner conventional in the art.

FIGS. 1A and 1B are a schematic structural representation of the fault-tolerant digital data processor 10 shown in FIG. 1C. The representation depicts functional units within the data processor 10 operatively connected along a bus. The representation shows a main cabinet 12, with slots 14 for a backpanel 16, two bulk power drawers 18, and a main cabinet fan 20. The backpanel representation 16 includes a main bus 22 (or "Stratabus"), two power supplies 24, and a clock 26. The main bus, or Stratabus, includes buses A 28 and B 30, and, functionally, a "bus" 32 which is used to represent faults that cannot be associated to either bus A or B. The main bus representation shows slots 34 (or "Strataslots") into which can be inserted CPU's 36, memory 38, or I/O processors 40.

The PK chassis 42 (see Fig 1B) is represented with slots 44 for I/O adaptors 46, and terminator cards 48. It also contains a pair of busses 50, a fan 52, and a power monitor 54. The I/O adaptor slots 44 accept I/O adapters for Ethernet, disk drawers 56, cartridge tape drives 58 and communications ports 60.

The states of these functional units are an important store of information for maintaining and diagnosing the data processor system 10. Determining those states in response to events occurring in the system, in response to the passage of time, and in response to each other's states, in a reliable and efficient manner is the goal of the invention.

The data processor includes a representation of the functional units of the processor shown in FIGS. 1A and 1B in the form of state managers arranged in a state machine For the elements of the processor 10 shown in Figs 1A and 1B, the state machine of the invention provides a prime state manager which in turn creates the appropriate number of slot state managers, etc. For a data processor having a different physical configuration, of course, the state machine would create a different configuration of state managers conforming to that different data processor.

Figure 2:
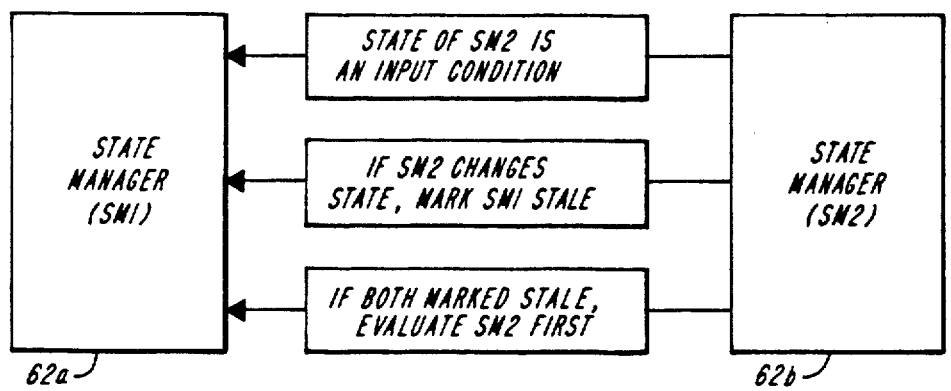
FIG. 2 is a schematic representation of state managers showing how their states may depend on each other.

In addition, the state managers interact with each other in at least three ways, as illustrated in FIG. 2. One state manager (SM1) 62a can look to the state of another state manager (SM2) 62b as an input condition in changing its own state. One state manager (SM1) can require that if another state manager (SM2) changes its state, it should be marked "stale," that is, require evaluation. Finally, one state manager (SM1) can specify that if it and another state manager are marked stale, the other state manager (SM2) should be evaluated first.

Figure 3A:
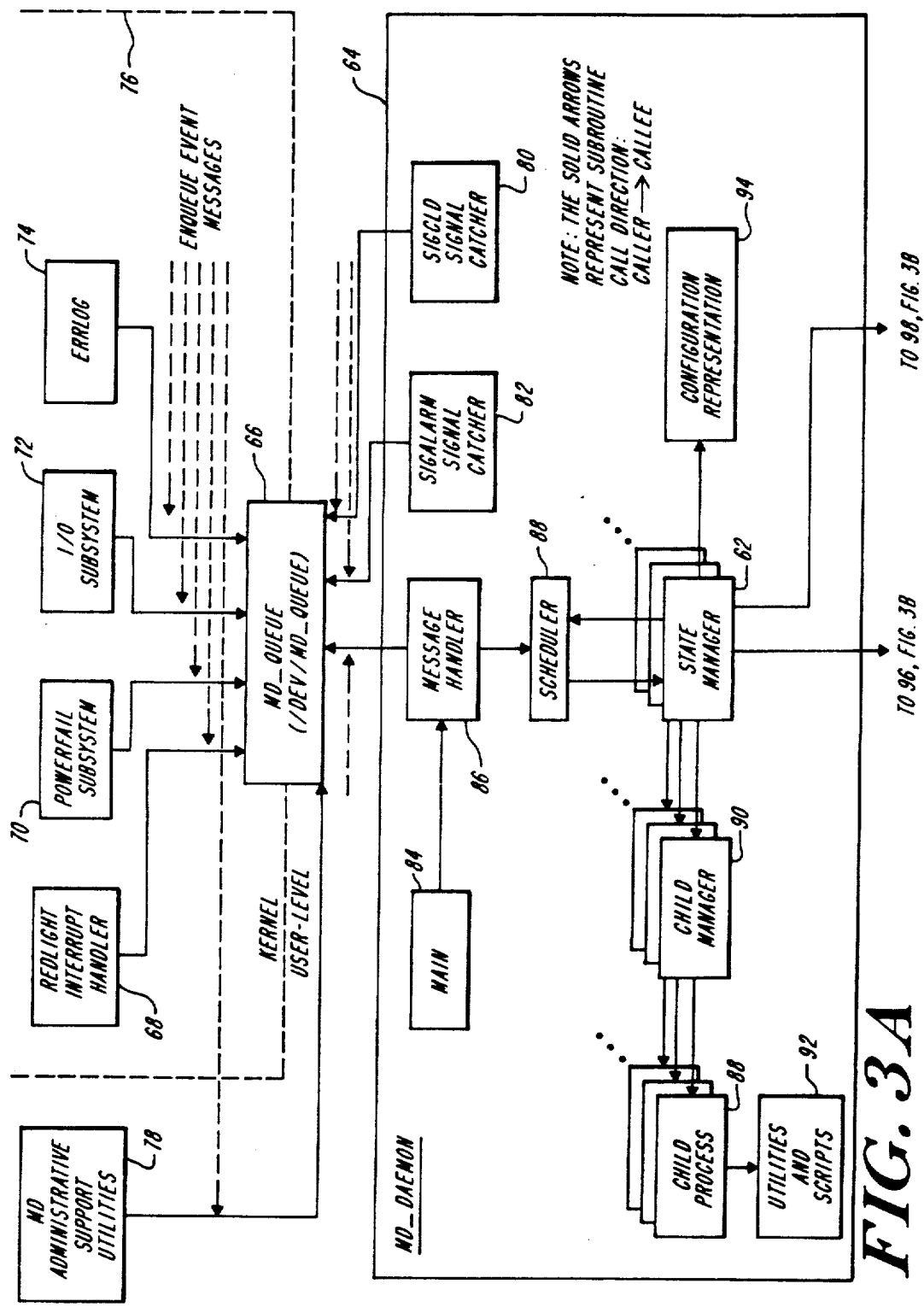
FIG. 3 is a schematic representation of the architecture of the state managers and associated processes.
Figure 3B:
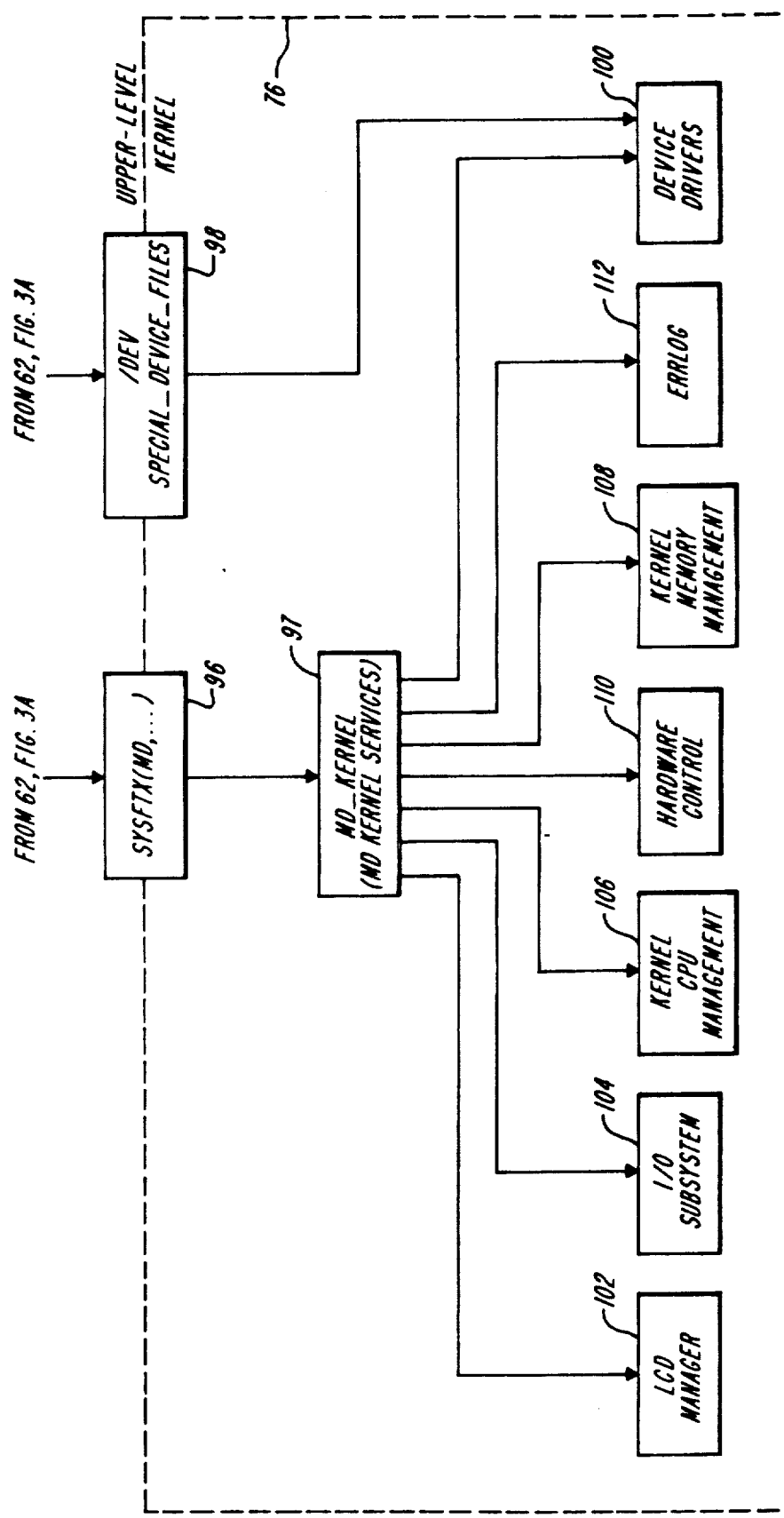
Figure 5:
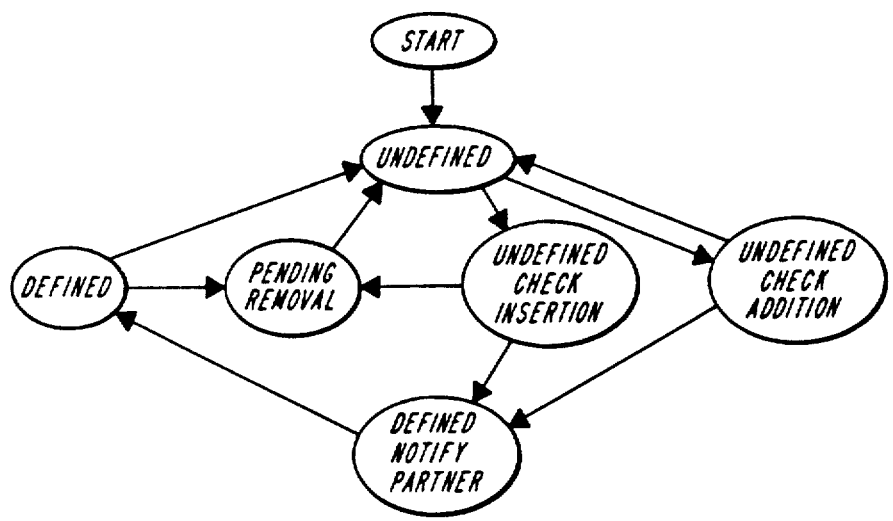
FIG. 5 is a flow diagram of the state transitions of a Strataslot state manager, referred to in Appendix C (which can be found in the application file)
Figure 6:
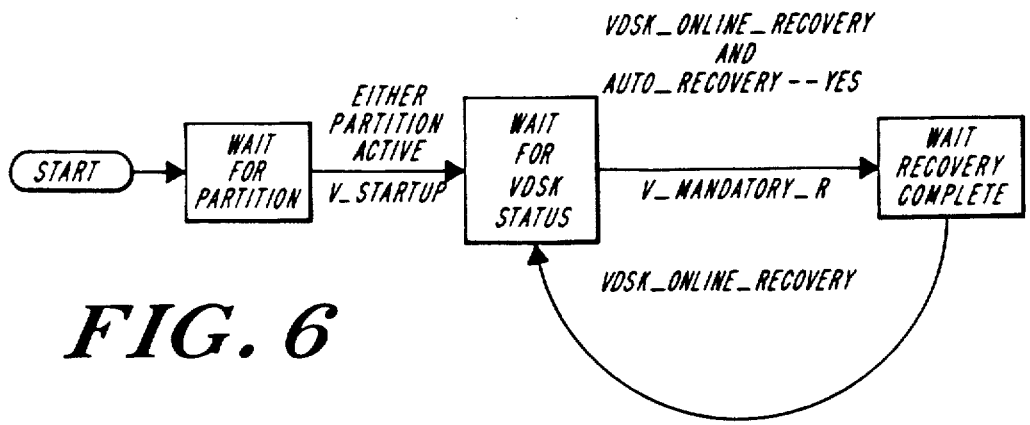
FIG. 6 is a flow diagram of the state transitions of a virtual disk state manager, referred to in Appendix C (which can be found in the application file)
Figure 8:
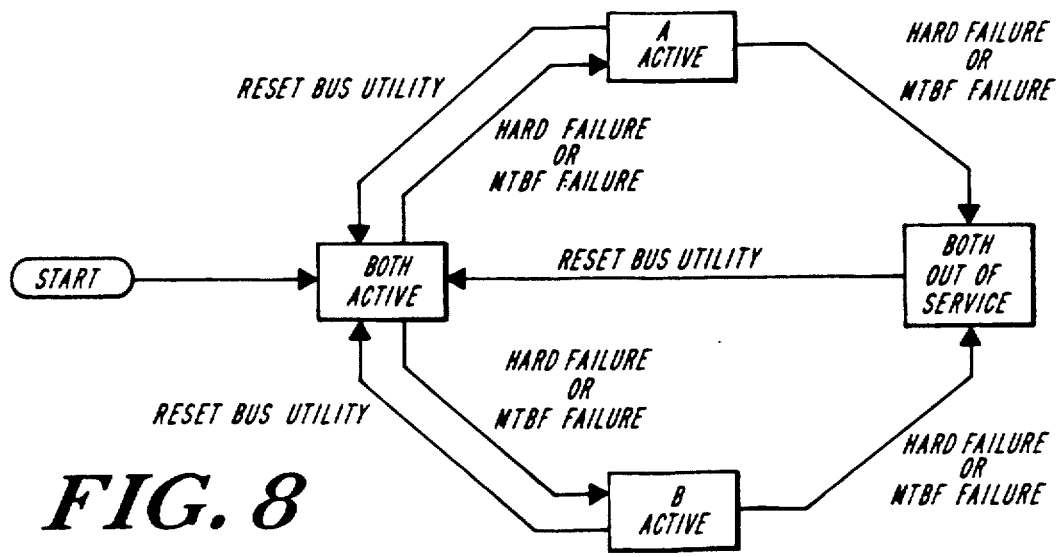
FIG. 8 is a flow diagram of the state transitions of a Stratabus state manager, referred to in Appendix D (which can be found in the application file).
Figure 7A:
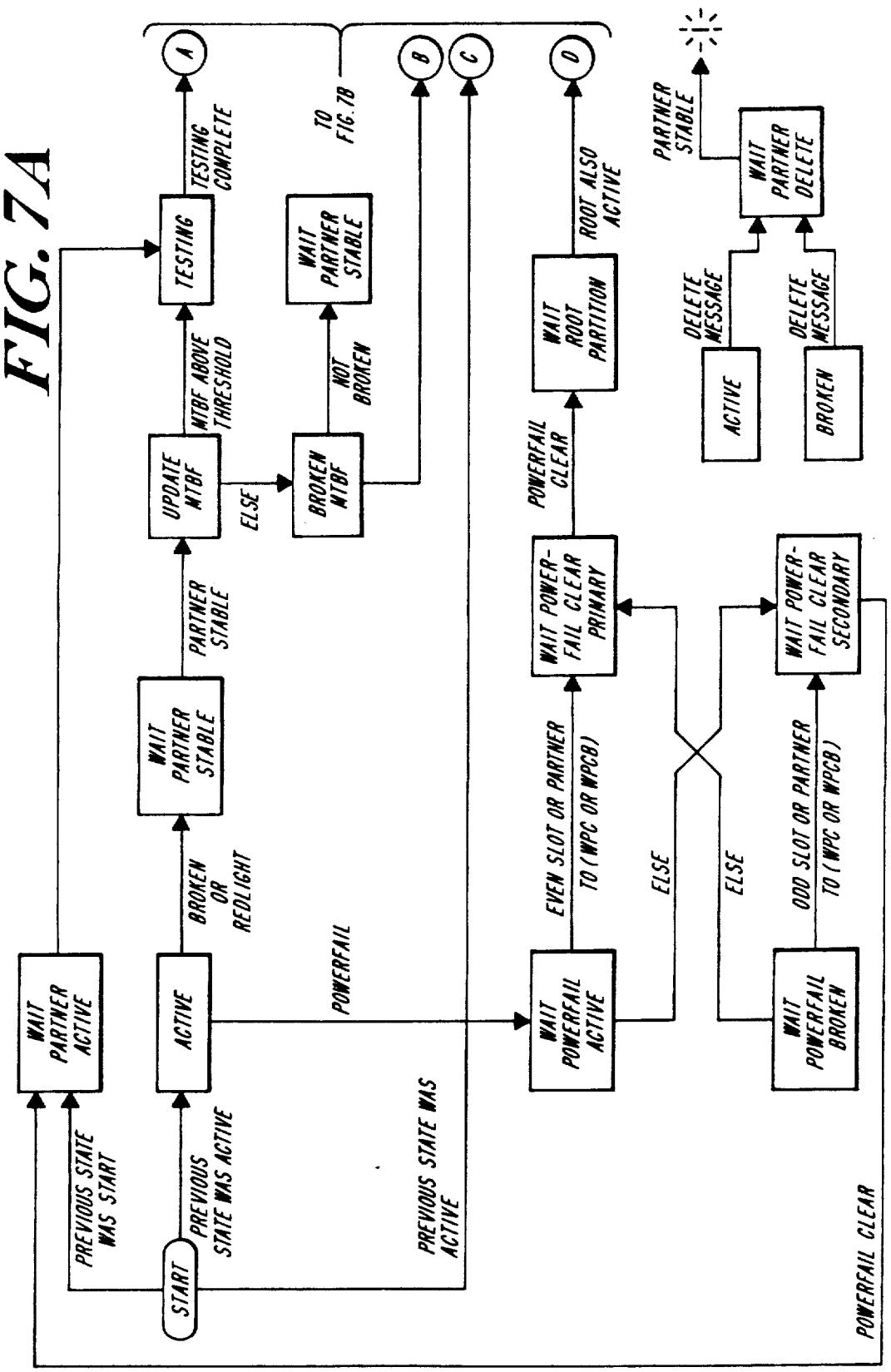
FIG. 7 is a flow diagram of the state transitions of an I/O processor state manager, referred to in D (which can be found in the application file)

FIG. 3 is a schematic representation of the architecture of the state managers 62 and associated processes. The MD daemon 64 is a user-level process that is event driven and that is responsible for managing the maintenance state of the data processing system 10.

Events are manifested as messages placed on a message queue 66 by the red light interrupt handler 68, the powerfail system 70, the I/O subsystem maintenance channel 72, and the error logging subsystem 74 (all parts of the operating system kernel 76) and by administrative support utilities 78. Other messages can come from the MD daemon itself, such as messages that a child process 80 created by one of the state managers has terminated or an alarm signal 82 from the operating system.

As shown in FIG. 3, the MD daemon has main portion 84 that can call on a message handler 86. The message handler 86 is the main loop of MD daemon. It dequeues event messages, calls a scheduler 88 to process those messages, and calls the scheduler 88 to evaluate state managers 62. The message handler 86 calls the scheduler 88 to evaluate a state manager 62 only when all event messages have been processed by the scheduler 88. This ensures that all possible scheduling has been done before a state manager 62 is chosen. Thus, all available event messages are processed between state manager evaluations. This ensures that the latency of MD (its ability to respond to new conditions) is no greater than the time it takes to evaluate one state manager 62. In fact the evaluation of a state manager 62 is limited to a transition from one state to another, before a check for further event messages is made.

The scheduler 88 processes event messages for the message handler 86, registers scheduling conditions for state managers 62, and chooses and evaluates state managers 62 for the message handler 86. The scheduler 86 chooses a state manager 62 for evaluation based on dependency links (the links between states of state manager illustrated in FIG. 2) and upon the priority of scheduling conditions registered by state managers 62. The scheduler maintains a running topological sort of the dependency links. This helps the scheduler 86 determine which stale state managers do not depend upon any other state managers also stale. Of those, the first with the highest priority is chosen.

A state manager 62 can create a child process 88 managed by a child manager 90 to execute time-consuming or indefinite actions, including using scripts and utilities 92. The state managers also maintain an internal representation of the configuration 94 of the data processing system 10.

The state managers use the sysftx (MD, . . . ) vendor specific system call 96 to access services 97 provided by the MD kernel. They may also access special device nodes 98 for devices 100 such as disks and communications ports.

The MD kernel calls upon utilities that can be divided into seven areas. One is the LCD manager 102 that provides control over a front panel Liquid Crystal Display unit and over a front panel red light. Others are the I/O subsystem 104, CPU management 106, memory management 108, hardware control 110, error logging 112, and device drivers 100.

A state manager 62 is the implementation of a finite state machine. It has a set of state values, and a set of transition arcs between those states. A transition arc has a boolean input expression, and a list of actions The state transition rules define transition arcs between states, and consist of six parts: (1) a rule label, (2) a state name, (3) an input expression, (4) actions, (5) scheduling condition actions, and (6) next state. The input expression can be any C language expression. This allows an input expression to invoke diagnostic tests, read hardware register values, look for and examine event messages, and even reference the state values of other state managers When a state manager is evaluated, the transition chosen is the first one out of the current state whose input expression evaluates to a non-zero value. It is possible for no transition to be chosen. The transition actions are specified by any sequence of C language statements. This allows the actions to send log messages, initiate child processes, remove event messages, perform hardware control operations, and make kernel calls.

A more detailed description of a particular embodiment of the invention in a specific data processor environment is set out in the following detailed description of a maintenance and diagnostics architecture, followed by a detailed description of a particular data processing system served by such an architecture. The details are meant to be illustrative and not limiting of the invention.

FTX Maintenance and Diagnostics Architecture

1. Introduction

This portion describes the Stratus MD software module. The description is done in 3 levels.

The first level presents a high-level, OS-independent architecture suitable for either VOS or FTX.

The second level refines this architecture into a design tailored for FTX.

The third level details this design.

The MD software module provides the software support for the fault-tolerant capabilities of the Stratus hardware architecture. It also supports non-hardware fault tolerant capabilities such as virtual disks (disk mirroring).

2. OS-Independent Architecture

The MD software module is depicted in FIG. 3. It has 4 components:

the MD daemon process (henceforth referred to as md_daemon);

the MD event queue (henceforth referred to as md_queue);

the MD kernel services (henceforth referred to as md_kernel).

the MD administrative support utilities.

2.1 The Daemon Process Md daemon

Md_daemon is a user-level daemon process. It is event-driven. It is responsible for managing the maintenance state of the Module. Module refers to the main cabinet, its associated expansion cabinets, and all the software inside. Software module refers to some component of software, such as the OS kernel, the I/O subsystem or MD).

Md_daemon contains a dynamically evolving model of the Module. This model represents the expected configuration (Expected configuration is what MD expects to be plugged in. Deviations (such as something missing, or something plugged in where nothing is expected) will be flagged.) of the components within the module (what's plugged into what slot, what's attached to what port, what logical entities (such as virtual disks) are present), and the maintenance state of each of those components. This model is then collectively the maintenance state of the Module as a whole.

The model is dynamic because of events. Md daemon responds to 3 kinds of events:

administrative requests;

insertions and removals of hardware components;
hardware failures and errors (including power failure).

Md_daemon responds to an event in 3 steps:
1. validate the changes in input conditions the event is alerting md daemon to;
2. make the appropriate transition in the Module maintenance state;
3. perform the actions associated with that transition.

The first step is validation. For administrative requests, validation is not necessary. The request has arrived and must be responded to. Other events are clues to md_daemon that some hardware condition may have changed. Md daemon examines those hardware conditions to determine their actual values. A few examples of hardware conditions are:
strataboard status;
IOA status;
stratabus status;
bulk power status.

The second step is a state transition. The current Module maintenance state, together with all the input conditions, determine the next Module maintenance state.

The third step is to perform the set of actions associated with that state transition. Actions are divided into 4 categories:
relying to administrative requests;
making kernel requests;
performing hardware control operations;
issuing log messages.

One purpose of these actions is to reflect pertinent aspects of the new Module maintenance state to the OS kernel, the hardware, and the outside world.

2.2 The MD Event Queue

As mentioned above, md_daemon is event-driven. Events are manifested as messages placed on the message queue md_queue, by sources both inside (e.g., interrupt handlers) and outside (e.g., administrative support utilities) of the OS kernel. This queue feeds md_daemon those messages.

2.3 MD Kernel Services

The MD kernel services (md_kernel) are a collection of maintenance and diagnostic subroutines placed within the OS kernel. They are placed within the kernel to achieve performance, efficiency of access to OS kernel services, and efficiency of access to hardware control. These services are used by md_daemon to do input condition validation, and to preform Module maintenance state transition actions. Examples are:
Memory test;
Disk test;
reading board status;
reading ID PROM;
access to kernel utilities to add, delete, and partner strataboards.

2.4 MD Administrative Support Utilites

Administrative requests are sent to md daemon through utility commands. These utilities place an event message on md_queue, and wait for md daemon to reply.

With these utilities the administrator can do such operations as:
display the Module maintenance state (i.e. list_boards);
add or delete a hardware or logical component from the Module expected configuration;
modify the MTBF threshold for a hardware component;
clear the fault history for a bus.

The MD Administrative Support Utilities will not be further described in this document.

3. FTX Implementation of the MD Architecture

FIG. 3 depicts the MD software module and its environment within an FTX Module. In the following sections, each of the components, and a brief overview of the interfaces they provide, will be described (see Section 4 and Appendix A (which can be found in the application file) for interface details).

3.1 Md daemon

Md_daemon is a user-level process, spawned by init via inittab(4). It waits for event messages from md_queue, using a blocking call. When one is received, md_daemon first determines what input conditions may have changed. Not all conditions need be examined; the set of those which must be examined is a function of the current Module maintenance state as defined by the model md_daemon maintains, and the event message received.

The current Module maintenance state and the new values of input conditions determine a maintenance state transition. This transition leads to a new Module maintenance state, and specifies a list of actions to be performed.

If the event message came from an administrative support utility, one of the actions will be to reply to the utility. This is done through a UNIX IPC message queue. The utility creates an IPC_PRIVATE msg_queue (see msgget(KE_OS), and places its key in the event message prior to enqueuing the event message on md_queue.

Md_daemon will call md_kernel to perform many of the state transition action (see section 3.3).

Some actions will be performed for md_daemon by device drives on devices accessed through the appropriate special device file. Md_daemon will use the normal mechanisms for device driver access (open, read, write ioctl(2)). However, a special open call will be used, allowing md_daemon to bypass the normal rejection done when the driver determines the device is not available.

The device drivers will all provide ACQUIRE/RETURN ioctl(2) calls. The ACQUIRE operation allows md_queue to ask for exclusive access to a device, in order to determine its maintenance state. The RETURN operation allows md_queue to relinquish exclusive access, while at the same time telling the driver what the device's maintenance state turned out to be.

3.1.1 Highlights of Md_daemon's Internal Structure

The Module maintenance state model is the primary component of md_daemon. This model is composed of many smaller maintenance state. models, one for each FRU (field replaceable unit) and each logical entity in the current configuration. These smaller models are called state manager. A state manager is a finite state automaton (i.e., state machine). Like a miniature version of the Module maintenance state model, a state manager is a model of the FRU or logical entity whose state it is managing. It responds to events in the same 3 steps:
1. validate changes in input conditions;
2. make the appropriate state transition;

3. perform actions associated with that transition.

Event messages are forwarded to the appropriate state managers, who use these as clues to possible input condition changes.

The state managers populate (are leaf nodes in) a tree data structure called the configuration representation. The configuration representation tree parallels the expected configuration of the Module. When a new component is added to the expected configuration, md_queue creates a subtree representing that new component, and attaches it to the appropriate leaf on the current configuration representation. Conversely, when an existing component is deleted from the expected configuration, the subtree representing that component is deleted. Either of these two actions results in a new configuration representation.

Since the state managers are nodes in such subtrees, they are created and begin their work when a subtree is created. For example, when a Fresco is added to a strataslot, a subtree (these will be called fru trees in section 4) representing that Fresco will be created and attached to the strataslot in the existing configuration representation. The state manager for that Fresco, part of that subtree, begins its work by determining the current maintenance state of the Fresco, and performs the actions (like logging an insertion message if the board is physically present) called for by the first state transition taken.

The overall Module maintenance state is the composition of the maintenance state of all state managers in the configuration representation. For this composition to accurately reflect the Module maintenance state, state managers must have the ability to interact. One state manager can use the maintenance state of another state manager as an input condition. State managers can declare dependencies between one another. Such a dependency ensures that state managers are evaluated in the proper order, and ensures that when a state manager is evaluated, those state managers which depend upon its maintenance state will be evaluated as well.

State managers are not processes; they are data structures and subroutines (i.e., objects) within md_daemon. Therefore it is important that any blocking kernel calls made by a state manager be very short-lived. Otherwise all state managers could be held up by a kernel call made from just one. This constraint is acceptable for 2 reasons.

1. A state manager can create a child process to execute time-consuming or indefinite actions; the state manager can monitor the progress of the child process as input conditions to state transitions, and can kill the child if necessary as a state transition action.
2. The IOP maintenance channel allows asynchronous operations on IOAs. The replies to these operations arrive in md_queue as event messages, which state managers can use as input conditions. This IOP feature significantly reduces the amount of child process overhead, by eliminating the need to use child processes for IOA operations.

Script execution is another feature state managers provide. The administrator may define the contents of shell script files for FRUs and logical entities in the expected configuration. The appropriate state manager will execute the section of this script file specific to a state transition when that transition occurs. This is a limited feature however, only some transitions for some state manager types will result in script execution. This is limited for performance reasons. A typical use of script files is to download firmware into a IOP or IOA.

3.2 Md queue

Md_queue is a queue for fixed-length messages. It allows multiple producers (at both kernel and user level) to simultaneously enqueue, and allows the consumer (md_deamon) to dequeue in a FIFO fashion.

Md_queue is implemented as a device driver; however, its only resource is a statically allocated buffer space in the kernel. An ioctl(2) is used to enqueue and dequeue messages. Ioctl() is chosen over read() and write() for protection; accidental re-direction of a utility's standard output into the device node for md_queue would cause trouble if write() were allowed.

Md_queue provides an additional ioctl(2) which blocks until 1 or more messages are placed on the queue. This is used by md_daemon. Once this call returns, md_daemon will remove and process all messages until none remain, at which point it will again make the blocking call.

There are 5 sources which enqueue messages:
MD administrative support utilities (user-level);
the redlight interrupt handler (kernel-level);
the Powerfail Subsystem (a kernel-level software module);
The I/O Subsystem maintenance channel (kernel-level software submodule [2]);
The Error Logging Subsystem (kernel-level software module).

As mentioned in the previous section, utilities place messages in md_queue. The ioctl(2) call then blocks until md_daemon has copied the utility reply back to the utility.

The redlight interrupt handler places a message in md_queue each time a redlight interrupt occurs.

The Powerfail Subsystem enqueues two messages: one when a powerfail has been detected, the other when a powerfail ridethrough or recovery has been successful.

The I/O Subsystem's maintenance channel submodule enqueues messages containing unsolicited commands from IOPs, and maintenance channel replies to md_daemon's asynchronous maintenance channel requests.

Some of the Error Logging Subsystem's log calls will be directed into md_queue. These will come primarily from the DAL, VDL, and device drivers. These kernel-level software submodules will log all abnormal events which they detect in the course of normal I/O activities. These events can be used to warn MD that a change in input conditions may have taken place.

Md_daemon can enqueue messages as well. It uses this ability at two times: whenever one of its child processes terminates, and when ever an alarm signal is received from the OS. The first use allows state managers to synchronize with the child processes they spawn. The second is used by md daemon to provide a time-out facility for state managers.

3.3 Md kernel

Md_kernel is a collection of subroutines linked into the kernel. Md_daemon accesses these through the vendor-specific UNIX system call. For FTX this is systftx(2). The first parameter of this system call will be "MD," causing it to call md kernel.

Md_kernel contains major subroutines to perform sometimes complex input condition validations and state transition actions, such as ID PROM reading and diagnostic tests. It also contains minor "pass-through" subroutines which access kernel utilities.

The kernel utilities that md_kernel uses for both its major and minor subroutines can be divided into 7 kernel areas:
LCD Manager;
I/O Subsystem;
CPU Management;
Memory Management;
kernel hardware control;
Error Logging;
Device Drivers.

3.3.1 LCD Manager

The LCD manager provides control over the front panel Liquid Crystal Display unit, and over the Module front panel red light. State managers use this to log FRU failures, and to turn on the Module red light whenever there are 1 or more FRU failures.

3.3.2 I/O Subsystem

State managers talk with the I/O subsystem through md_kernel to converse with IOAs over the IOP maintenance channels, to invoke diagnostic tests, and to tell the I/O Subsystem of changes in the IOP maintenance state and configuration.

3.3.3 Kernel CPU and Memory Management

State managers use md_kernel to tell these portions of the kernel about changes in CPU and Memory maintenance state and configuration. The Memory diagnostic tests also call upon kernel memory management to allocate physical and virtual memory for Memory diagnostic tests.

3.3.4 Kernel Hardware Control

Md_kernel accesses strataboard I/O for both its major and minor subroutines, in order to reset boards, read status registers, and write control registers.

3.3.5 Kernel Error Logging

MD places log messages in the kernel error log whenever significant maintenance state changes occur. These are especially useful when tracking down the history of an elusive or intermittent error or fault.

3.3.6 Device Drivers

Some driver operations are not accessible through ioctl(2) calls, so must be made from kernel-level by md_kernel. However, these calls still require a file descriptor, from an open call made in user-mode.

For physical disks, these operations facilitate validation of input conditions (is the disk present, is it spinning, is it formatted), and are used in the disk diagnostic tests.

4. MD Detailed Design

The purpose of this section is to describe the interfaces between MD and other FTX software modules. This will include explanations of why these interfaces are needed and how they will be used. In addition, the internal structure of md_daemon will be presented.

The specific parameters, return codes, and associated header files for each interface subroutine will be compactly described in Appendix A (which can be found in the application file).

This section contains 3 subsections, for md_daemon, md_queue, and md_kernel. Each of these will describe that component of MD in greater detail, describe the interfaces it provides to other FTX software modules, and the interfaces it is expecting from other FTX software modules.

4.1 Md daemon

FIG. 3 shows the internal structure of md daemon. There are the following components to describe:
main
message handler
scheduler
state managers
child managers and child processes
configuration representation
child and alarm signal catchers.

4.1.1 Md daemon Startup and Main

Md_daemon is created at boot time by the init process. It communicates with init. This allows init to wait for md_daemon to determine the maintenance state of the components of the configuration referenced in inittab (e.g. ttys and physical disks), and give them to the I/O Subsystem and device drivers.

This will be implemented with 2 lines in inittab.
md1::boot:md_daemon:#initial invocation
md2::bootwait:mdready:#wait for md_daemon to signal completion The first line is placed before other boot or bootwait lines. It invokes md, which then determines the module configuration and gives the devices in that configuration to the I/O subsystem.

The second line invokes a process whose sole purpose is to wait for md_daemon to complete the aforementioned work. It terminates when md_daemon tells it to.

4.1.1.1 External Interfaces

The utility hw_in_use provides md_daemon's first contact with the outside world. It sends a list of hardware records to md_daemon's standard input. Each hardware record is a 2-tuple, consisting of a hardware model number and a hardware device address.

At boot time the hw_in_use utility gets this information from the kernel, which in turn received the information from kernel initialization, which pulled the information from the boot PROM MCT.

4.1.2 Message Handler

The message handler is the main loop of md daemon. It is called by md_daemon's main() entry point. The message handler's job is to dequeue event messages from md_queue, call the scheduler to process those messages, and to call the scheduler to evaluate state managers.

The following pseudocode describes the message handler's operation.

```
while (TRUE){
    while (event message available OR any stale. The
term stale, when applied to state managers, means the
state manager's maintenance state needs to be
re-evaluated. state managers){
        if (event message available){
            get event message
            tell scheduler to process event message
        }else{
            tell scheduler to evaluate 1 state manager
        }
```

```
}
        block until event message available
}
```

There are several important features to note.

First, a state manager is evaluated only when all available event messages have been processed. This ensures that all possible scheduling has been done before a state manager is chosen.

Second, all available event messages are processed between state manager evaluations. This ensures that the latency of MD (its ability to respond to new conditions) is no greater than the time it takes to evaluate 1 state manager.

Finally, md_daemon blocks only when there are no more event messages to process, and all state managers are fresh. When a new message arrives, the cycle begins again.

There are six kinds of event messages the message handler can obtain from md_queue:
Redlight Interrupt events
Powerfail Events
I/O events
utility requests
alarm signals
child signals

4.1.2.1 Redlight Interrupt Events

These are the simplest. They are enqueued by the red light interrupt handler.

4.1.2.2 Powerfail Events

There are two kinds: fail and clear. The fail event is enqueued whenever the Powerfail Subsystem determines that the Module is at risk due to an imminent power failure. The clear event is enqueued whenever the Powerfail Subsystem determines that a successful powerfail ride-through or recovery has occurred.

4.1.2.3 I/O Events

I/O event messages contain an event code, the hardware device address of the hardware in trouble, and auxiliary data specific to the event code.

These are enqueued from 2 sources: the I/O Subsystem and the Error Logging Subsystem.

The I/O Subsystem enqueues and I/O event message whenever an unsolicited maintenance channel message arrives from an IOP, and whenever a reply to an md_daemon_initiated asynchronous maintenance channel command arrives from the IOP.

The Error Logging Subsystem enqueues an I/O event message for those log messages designated for consumption by MD.

4.1.2.4 Utility Requests

Utility request messages are very similar to I/O event messages. They contain a utility code, a hardware device address for the hardware to which the request pertains, and auxiliary data specific to the utility code. They also contain a message queue key to be used for the reply.

4.1.2.5 Alarm Signals

The scheduler issues alarm(2) calls to the OS, in order to manage its time-out queue. The signal catching function for SIGALRM enqueues whenever it catches that signal.

4.1.2.6 Child Signals

When a child process (created by a state manager) terminates, the signal catching function for SIGCLD catches the resultant signal and enqueues a message containing the child's pid and termination status.

4.1.3 Scheduler

The scheduler provides services for the message handler and for state managers.
It processes event messages (for the message handler).
It register scheduling conditions (for state managers).
It chooses and evaluates state managers (for the message handler).

4.1.3.1 Event Message Processing

The scheduler processes the 6 kinds of event messages in different ways.

4.1.3.1.1 Red Light Interrupt Event Messages

The scheduler marks as stale each state manager which has an outstanding red light scheduling condition. The message is then discarded.

4.1.3.1.2 Powerfail Event Messages

This is treated similarly. When the scheduler is asked to process a powerfail message, it marks as stale each state manager which has an outstanding powerfail scheduling condition of the appropriate type (fail or clear). The message is then discarded.

4.1.3 1.3 I/O Event Messages

A state manager can give the scheduler a description of any message it would like to know about. If such a message arrives, the scheduler marks that state manager stale and gives it a copy of the message.

4.1.3.1.4 Utility Request Messages

These are handled in the same way as I/O Event Messages.

4.1.3.1.5 Alarm Signal Messages

This message causes the scheduler to obtain the current time from the OS, and check its time-out queue to see if any state managers on it have time-out. It marks those state managers stale, makes another alarm(2) call, and discards the message.

4.1.3.1.6 Child Signal Messages

If a state manager has registered a child termination scheduling condition matching the pid in this message, the scheduler marks it stale. The message is then held for that state manager, so it can access the child termination status.

4.1.3.2 Scheduling Conditions

State managers can register various kinds of scheduling conditions with the scheduler. When any of these conditions becomes true for that state manager, it is marked stale.
1. redlight-mark stale when a redlight interrupt occurs.
2. powerfail fail-mark stale whenever a powerfail occurs.
3. powerfail clear-mark stale whenever a powerfail clear occurs.

4. timer-mark stale after the specified amount of time has elapsed.
5. alarm-mark stale when the specified time epoch occurs.
6. I/O event-mark stale whenever an I/O event message arrives from the kernel with the specified I/O event code and hardware device address.
7. utility-mark stale whenever a utility message arrives with the specified utility code and hardware device address.
8. child-mark stale after the termination of the child process specified by the pid.
9. dependency link-note a dependency between the calling and the specified state manager. If the specified state manager is ever evaluated, mark the calling state manager stale. Also, if both the calling and the specified state manager are stale, evaluate the specified one first, as the calling one depends upon the specified one's maintenance state.
10. lock-mark stale when the state manager owns the specified lock object. Locks are actually PV counters. They are useful in several areas. For example, in limiting the number of child processes, or for limiting the number of simultaneous Memory tests.

The scheduler provides additional calls for state managers to examine and retrieve event messages, delete scheduling conditions, and to examine lock status.

The calling state manager specifies a priority for each scheduling condition it registers. This will be used by the scheduler in choosing which of the stale state managers to evaluate.

4.1.3.3 Stale State Manager Scheduling

The message handler will call upon the scheduler to choose 1 stale state manager and evaluate it. The scheduler does this based upon dependency links and priorities.

The dependency links are established by state managers, as described in the previous section. A state manager's priority is the highest of the priorities of that state manager's scheduling conditions which are true.

The scheduler maintains a running topographical sort of the dlinks. This helps the scheduler determine which stale stage managers do not depend upon any other state managers also stale. Of those, the first with the highest priority is chosen. A software listing depicting a preferred practice of the invention is attached as Appendix E. The aforementioned topographical sort is found in the procedures in the file link and, particularly, link propagate_stale, link_propagate_fresh, record_propagate_stale, and record_propagate_fresh.

4.1.4 State Managers

A state manager is the implementation of a finite state machine. It has a set of state values, and a set of transition arcs between those states. A transition arc has a boolean input expression, and a list of actions.

A formal notation, called SMSL (State Manager Specification Language), has been devised for state managers. This notation is formally defined in Appendix B (which can be found in the application file). Examples of state managers written in SPSL are given in Appendix C (which can be found in the application file).

The SPSL pre-processor converts an SPSL source file into two C language source files a .c file and a .h file. The .h file allows other state managers to reference the maintenance state of that state manager.

The most important portion of an SPSL file are the state transition rules. These define transition arcs between states. A SMSL transition rule consists of 6 parts:
1. a rule label;
2. a state name;
3. an input expression;
4. actions;
5. scheduling condition actions;
6. next state.

The input expression can be any C language expression. This allows an input expression to invoke diagnostic tests, read hardware register values, look for and examine event messages, and even reference the state values of other state managers.

When a state manager is evaluated, the transition is the fist one out of the current state whose input expression evaluates to a non-zero value. It is possible for no transition to be chosen.

The transition actions are specified by any sequence of C language statements. This allows the actions to send log messages, initiate child processes, remove event messages, perform hardware control operations, and make kernel calls.

There are 22 specific state manager types. These are each briefly described in Appendix D (which can be found in the application file).

4.1.5 Child Managers

A state manager can create a child process. This is done for three reasons: to achieve concurrency (and take advantage of the multiprocessing capability of a Module), to prevent time-consuming synchronous operations (such as some I/O and diagnostics) from blocking other state managers, and to execute administrator-defined shell scripts.

The state manager allocates a child manager structure for each child process. The child manager abstraction hides all of the details of fork-ing and exec-ing. It allows the child to send results back to the state manager prior to termination.

The state manager can ask the child manager for the pid of the child process, which it then uses to register a child scheduling condition.

4.1.5.1 External Interfaces

The state managers use the sysftx(MD, . . . ) vendor specific system call to access the services provided by md_kernel.

The state managers access special device file nodes for devices such as disks and comm ports. Two special capabilities must be provided to facilitate this. First, a special open(2)-like system call, md_open(), is required to allow the state managers to open these devices without being denied access due to hardware problems. Second, the drivers must provide ioctl(2)'s for state managers to ACQUIRE and RETURN devices.

4.1.6 Configuration Representation

Md_daemon must maintain an internal representation of various aspects of the module configuration: the hardware hierarchy, the list of virtual disks, the file system mount hierarchy (both local and remote), and local area network configuration.

State managers are responsible for growing and shrinking these configuration representations, for maintaining the maintenance state of the components of the configuration, and for creating and destroying state managers as the configuration grows and shrinks.

4.1.7 SIGALRM Signal Catcher

As described earlier, this component of md daemon merely enqueues an alarm signal message whenever it catches the alarm event. The alarm event occurred because the scheduler issued an alarm(2) system call.

4.1.8 SIGCLD Signal Catcher

Also described previously, this signal catcher does a wait3(2) call to retrieve the termination status of a child process. It then enqueues a child signal message.

4.2 Md queue

As described in section 3.2, 5 external sources place messages in md_queue. For each of these a subroutine is provided to take care of the details.

The administrative support utilities will call md_utility(). They must supply a utility code, hardware device address, and auxiliary data, as well as a private IPC msg queue if a reply is required.

The redlight interrupt handler will call md_redlight(). This routine will enqueue an event message.

The powerfail subsystem will call md powerfail(), supplying a parameter indicating which kind of event is being enqueued: fail or clear.

The I/O Subsystem will call md_ioss(). It will supply an event code and hardware device address, and a RCMD (ring command).

The Error Logging Subsystem will call md_log(). It will supply an event code, a dev_t value, and auxiliary information specific to the event code. md_log() will map the dev_t to a hardware device address prior to enqueuing the event message.

4.3 Md kernel

The kernel utilities Md_kernel calls upon can be divied into 7 areas:
LCD Manager;
I/O Subsystem;
CPU Management;
Memory Management;
kernel hardware control;
Error Logging;
Device Drivers.

4.3.1 LCD Manager

The LCD manager provides control over the front panel Liquid Crystal Display unit, and over the Module front panel red light. MD can
add a message to the display (add_lcd message()),
delete a message from the display (del lcd_message()),
modify a message on the display (replace_lcd_message()),
turn on the Module front panel red light (set_module_redlight());
turn off the Module front panel red light (clr_module_redlight()).

These are used to log FRU failures, and to enforce the front panel red light rule: if one or more FRUs are bad, the red light should be on.

The red light and LCD operations are both provided by this one software module because of the underlying coupling between the 2 in the hardware.

4.3.2 I/O Subsystem

Md_kernel accesses the I/O subsystem for several purposes:

to place maintenance channel messages on an IOP command ring dal_iop_maint cmd());
to run the various IOP diagnostic tests (dal_test_iop());
to add and delete logical IOPs to and from the I/O subsystem (add_logical iop(),delete_logical_iop()).
to partner and unpartner physical IOPs (add_partner_iop(), del_partner_iop());
to switch IOPs between primitive and entity I/O mode (switch_iop_io()).

Md_queue uses the maintenance channel command to communicate with IOAs. The remainder of the calls are used to give the I/O Subsystem new IOPs when they are added and pass diagnostics, and to allow md_daemon to thread through the treacherous series of state transitions necessary to successfully bring up the boot IOP.

4.3.3 Kernel CPU Management

MD_kernel calls upon these portions of the kernel to
add logical CPUs to the kernel (add logical_cpu());
delete logical CPUs from the kernel (del_logical_cpu());
partner physical CPUs (add_partner cpu());
unpartner physical CPUs (del_partner cpu());

These calls allow md_queue to give new CPUs to the kernel when they are added and pass tests.

4.3.4 Kernel Memory Management

MD_kernel calls upon these portions of the kernel to
add logical Memories to the kernel (add logical_memory());
delete logical Memories from the kernel (del_logical_memory());
partner physical Memories (add_partner memory());
unpartner physical Memories (del partner_memory());
allocate a contiguous range of virtual memory, and map it to a specified contiguous range of physical memory (mapin(), and a routine not yet defined).

The allocation and mapping is needed by the Memory diagnostic test to determine the maintenance state of a Memory board prior to giving it to the kernel for regular use.

4.3.5 Kernel Hardware Control

MD needs to access several parts of strataboard I/O: the I/O page, the paired I/O page, and the memory global I/O page. Following are some examples of how this will be used.

The strataboard status register is read to determine if a board is present, online, red-lighted, which bus is being obeyed, etc.

Strataboards must be reset to determine if they have been broken or were physically removed.

The ID PROM on each strataboard must be read.

Several other status and control registers must be accessed for various miscellaneous operations (such as bulk power status).

All of this memory-mapped, so no special I/O routines are used.

4.3.6 Kernel Error Logging

MD places log messages in the kernal error log whenever significant maintenance state changes occur. These are especially useful when tracking down the history of an elusive or intermittent error or fault.

The Error Logging Subsystem is still undefined. However, it is assumed it will resemble the kernel error logging mechanism defined in errlog.c.

4.3.7 Device Drivers

Some driver operations are not accessible through ioctl(2) calls, so must be made from kernel_level by md_kernel. However, these calls still require a file descriptor, from an open call made in user-mode.

For physical disks (see [4]), there are 10 such operations.

read_reserved_block()
write_reserved_block()
prim_read_blk()
prim_write_blk ()
find_present_drive()
check_drive_present()
check_drive_ready()
seq_up_drive()
seq_down_drive()
get_mailbox()

These operations facilitate validation of input conditions (is the disk present, is it spinning, is it formatted), and are used in the disk diagnostic tests.

The read and write reserved operations allow the disk diagnostic to check if the device is formatted, and allow it to read the disk label prior to knowledge of the disk geometry (which is in the label). The primitive read and write operations allow the diagnostic to access all of the disk during the diagnostic, using primitive I/O and no bad-block re-mapping. The find and check operations are useful for both the disk diagnostic test and the stat manager input conditions. The sequence operations are used in the diagnostic test. The mailbox operation provides information about the disk fan.

FTX Maintenance and Diagnostics Administration

1. Introduction

This describes the Administrator's view of the maintenance, diagnostic, and configuration features of an FTX Module. Specifically, all aspects of the Module's operation and behavior in these areas, which are either directly or indirectly perceived or important to the Administrator, are described.

2. Module Feature

In this section, the term "Module" refers to a Stratus main cabinet (described below) and its associated expansion cabinets, and the software running on them.

2.1 Main Cabinet Types

This architecture accommodates the 40-slot and the current and new 10-slot XA main cabinets.

The 40-slot cabinet is somewhat of a misnomer, as it accommodates only 32 Strataboards. The other eight slots are there for historical reasons. They provided space for "sandwich" Strataboards (CPU and Memory) which were composed of a main board and two companion boards. Strataslots 0, 1, 30, and 31 have companion slots 0A and 0B, 30A and 30B, 31A and 31B. None of the Strataboards supported by this architecture have companion boards; thus these companion slots will be unused.

The current 10-slot cabinet will accommodate only one logical Fresco CPU (in slots 0 and 1). There may be a new 10-slot cabinet type which will accommodate more than one Fresco.

2.2 FRUs

2.2.1 FRU Definition

A Module is partitioned into FRUs (Field Replaceable Units). FRU boundaries are physical configuration boundaries, such as slots, sockets, and connectors. However, the converse is not necessarily true; not all physical configuration boundaries are FRU boundaries. For example, the cable interconnecting the K105 Disk 10A FRU and a D202 Disk Drive FRU could be considered a FRU as well, but instead is lumped in as part of the D202 Disk Drive FRU.

Following is a list of FRUs considered by this architecture. See FIG. 1 for a pictorial representation of each FRU.

1. Main Cabinet—one of the three cabinet types listed above. It accepts a corresponding Backpanel FRU, two Bulk Power Drawer FRUs (one for even Strataslots and one for odd), and a Main Cabinet Fan FRU.
2. Bulk Power Drawers—two in each main cabinet, one to power even and one to power odd slots.
3. Main Cabinet Fan
4. 40 Slot Backpanel—includes the Stratabus, the A and B Backpanel Power Supplies, and the Clock as sub-FRUs. The Stratabus sub-FRU contains three sub-FRUs of its own: Bus A, Bus B, and Bus, representing respectively faults on the A-side of the Stratabus, faults on the B-side, and Stratabus faults which cannot be resolved to one side or the other.
5. Current 10 Slot Backpanel—similar to the 40-slot, but smaller and accepts CPUs only in slots 0 and 1.
6. New 10 Slot Backpanel—will accept more CPUs: slots 0, 1, 2, and 3.
7. G200—Fresco CPU.
8. M408—8 Megabyte Wallaby Memory.
9. M432—32 Megabyte Wallaby Memory.
10. K100—IOP (I/O Processor), can drive one PK Chassis.
11. PK Chassis—cable and card cage for IOAs, connects to two IOPs.
12. K105—disk IOA.
13. D202—320 Mbyte disk drawer.
14. D203—781 Mbyte disk drawer.
15. D205—151 Mbyte disk drawer.
16. Disk Fan—plugs into a slot on any of the above disk drawers.
17. K101—full modem acomm IOA.
18. K111—null modem acomm IOA.
19. K103—ccomm IOA, contains non-volatile calendar-clock, null modem port for use as console, and full modem port for RSN.
20. K102—ucomm IOA.
21. K109—ucomm IOA.
22. HIF—Host Interface Card, a programmable communications IOA.
23. K106—cartridge tape IOA.
24. Cartridge Tape Drive.
25. K107—9-track tape IOA.
26. —9-Track Tape Drive.
27. K104—Ethernet IOA.
28. K108—PK "terminator", two per PK Chassis, placed in the last two slots.

2.2.2 FRU Maintenance State Monitoring

The Module continuously monitors and when necessary evaluates the maintenance state of each FRU (and sub-FRU, described later). Also, the Module attempts to advance the maintenance state whenever possible; for example, synchronizing a logical memory board when the second of the Pair becomes available, or resuming disk diagnostics once a Disk Drawer has become formatted. The possible maintenance state values of each FRU are described in subsequent sections.

In addition to monitoring and evaluating the maintenance state of each FRU, the Module will track configuration changes. For example, the addition of a new logical CPU, or the deletion of a K101 accomm and its ports.

The Module shall provide the Administrator a utility for displaying the configuration and maintenance state of each FRU in the Module.

2.2.3 FRU Fault Location Limitations

In general, the Module will locate failures to within a single FRU. However, there are faults on different FRUs which cannot be distinguished from one another. These cases will be pointed out. For example, the CPU TA_MISMATCH state indicates a fault exists in one or more of the members of a logical CPU, but the Module cannot tell in which.

2.2.4 FRU MTBF Calculations

Some FRUs can suffer "transient" failures. When this occurs, the Module will restore the FRU to normal operation (this is called FRU recovery).

The Module measures the average rate of recovery each FRU requires. This measurement is expressed as an interval of time called the Mean Time Between Failure (MTBF). If a FRU's MTBF falls below its MTBF threshold, the Module will consider that FRU to be faulty, and will no longer recover that FRU.

There is a default value of the MTBF threshold for each FRU type. The Administrator may use utilities to change the MTBF threshold for any FRU instance. The Administrator may also use a utility to reset the MTBF value for any FRU instance.

The MTBF for a FRU instance is reset whenever that FRU is physically inserted into its slot.

2.2.5 FRU Logical Addition and Deletion

A general strategy will be adhered to concerning FRU configuration management. After bootstrap, the contents of a slot will be considered to be "UNDEFINED". Subsequent insertion of a FRU into a slot will be considered by the Module to be a request to add that FRU to that slot in the Module. FRUs already present in slots during boot will be dealt with if they were just inserted. This is subject to certain constraints described in subsequent sections (such as logical Strataboards).

If the FRU is at a later time removed from that slot, the FRU is considered still there, but its maintenance state is "MISSING." To delete the FRU from that slot (i.e., return the slot's state to "UNDEFINED"), the Administrator must use a utility to tell the Module to do so.

2.2.6 FRU LEDs

Some FRUs have a red LED, known as the red light, which is illuminated if the FRU is faulty and should be replaced. There are exceptions and extensions to red light operation, which will be pointed out for particular FRUs.

2.2.7 Sub-FRUs

Some FRUs provide multiple independent functions. It is sometimes possible to locate faults that affect some of those functions in the FRU, but not the others. Those FRUs are partitioned into sub-FRUs.

Comm IOAs have sub-FRUs, one for each port. A port is a physical connection to a communications line. The port sub-FRU is that portion of the IOA which is specific to one physical connection ("port"). Faults that affect the operation of just one port will be attributed to that port sub-FRU.

It is important to note that sub-FRUs cannot be independently replaced. Physical board removal or insertion simultaneously remove or insert the parent FRU and all its sub-FRUs.

The sub-FRU model allows the Module to consider one part of a FRU as faulty, without immediately considering the remainder of the FRU faulty. Of course, the actual problem is only being deferred. To repair the sub-FRU, the entire FRU must be replaced.

Following is a list of sub-FRUs considered by this architecture.
1. Stratabus—sub-FRU of Backpanel/
2. Bus A and Bus B and "Bus"—sub-FRUs of Stratabus.
3. Backpanel Power Supply—sub-FRU of Backpanel
4. Clock—sub-FRU of Backpanel.
5. PK Fan—sub-FRU of PK Chassis.
6. P Bus and Q Bus—sub-FRUs of PK Chassis.
7. PK54 Power Monitor—sub-FRU of PK Chassis.
8. K101 Port—sub-FRU of K101.
9. K111 Port
10. K103 Console Port
11. K102 Port
12. K109 Port
13. HIF Port
14. K103 RSN Port
15. Clock-Calendar—sub-FRU of K103.

2.2.8 FRU State Transition Logging

The Module will generate a log message each time something of significance happens or is done to a FRU or sub-FRU. These will be folded into the UNIX system error logging stream going into the special file /dev/error, managed by the errdaemon process. The Module shall provide utilities for analyzing these FRU log messages.

The log messages will provide whatever information is necessary to locate the subject FRUs within the Module's FRU hardware configuration.

2.2.9 FRU Shell Scripts

The module will look for and execute a shell script on FRU state transitions. The module passes the script parameters which tell which state transition occurred. The administrator may edit these scripts. Typical operations included in such a script are firmware downloads and RAM dumps.

The scripts are contained in the directory /etc/maint. They are named <FRU><slot><slot>*. For example, the script for the K101 in PKslot 11 attached to the logical IOP in Strataslot 2 would be "/etc/maint/K101.2.11." Another example: the physical CPU in Strataslot 12 would have "etc/maint/G200.13" for a script file.

If there is no script file for a particular FRU instance, the module will look for a FRU type script file to execute. These are named for the FRU type, with no appended slot number list to specify a particular FRU instance. For example, "/etc/maint/M432" is the generic 32 MB Wallaby script.

In some cases the FRU's next state is a function of the script results. These results are indicated by the exit status of the script.

3. Bulk Power Drawer Features

The Main Cabinet contains slot for two Bulk Power Drawers. One powers even-numbered Strataslots, the other odd. They each contain an AC-to-DC converter and a battery power system. They are continuously monitored by the Module, and have the following maintenance state values:
1. NO_AC—the AC feed into the drawer is dead;
2. LOW_CHARGE—the battery is less than 90% charged.
3. GOOD—the Drawer is in good working order.

These state values are not to be confused with the three LEDs on the front of a Bulk Power Drawer:
Power Good—a green LED, on if the Bulk is receiving AC power;
Battery Voltage Good—a yellow LED, on if the battery is at least 90% charged;
Battery Charging—another yellow LED, on if the battery is undergoing high-current charging.

4. Main Cabinet Fan Features

The Main Cabinet is ventilated by fans, 3 in the 40-slot, 2 in the 10-slot. Each has its own red light. The Module cannot distinguish one fan failure from another, nor can it tell how many have failed. Therefore, it maintains one maintenance state for all:
1. BROKEN—one or more of the fans is not working;
2. GOOD—all fans are in good working order.

5. Backpanel Features

A backpanel FRU contains four sub-FRUs:
1. a Stratabus;
2. two Backpanel Power Supplies (one for the A Bus and one for B Bus); and
3. a Clock.

6. Backpanel Power Supplies

There are two Backpanel Power Supplies bolted onto the Backpanel. One powers the A Bus, one the B Bus. They fail in a hard manner, with no recovery possible; hence, the very simple maintenance state values:
1. BROKEN
2. GOOD.

7. Clock Features

The Stratabus clock signal is supplied by a bolt-on circuit board, called Clock. It is somewhat fault-tolerant, having redundant circuitry, and its power is derived from a diode-ORing of the two Backpanel Power Supplies. However, there is no diagnostic status available to the Module, so its maintenance state cannot be determined.

8. Stratabus Features

Each main cabinet contains a backpanel which contains a fault-tolerant bus, the Stratabus. The Stratabus has slots (32 or 10) into which can be inserted CPUs, Memory, or I/O Controllers (e.g., the IOP). These are known as Strataboards.

8.1 Logical Strataboards

A logical Strataboard is a pair of physical Strataboards which can be synchronized into lockstep operation for fault tolerance. The pair of slots occupied by a logical Strataboard is a logical Strataslot.

A logical Strataslot is always composed of two adjacent physical Strataslots, where the first (lowest numbered) of the pair has an even slot number.

The two physical Strataboards composing a logical Strataboard are also known as "partners."

8.2 Logical Strataboard Addition

Initially, a Strataslot's contents are undefined. Once a physical Strataboard is inserted into such a slot, the Module adds a logical Strataboard of that type to itself, and sets the expected contents (see next section) of this and its partner slot to that type.

Subsequently, all combinations of physical removals and insertions may occur on these slots, and these are represented as various fault states of the slot contents.

However, when a Module bootstrap occurs, all memory of expected Strataslot contents is lost. The Module then uses the contents of the Stratabus slots to determine the expected contents of each Strataslot.

8.3 Logical Strataboard Deletion

The expected contents of a logical Strataslot can be cleared only by explicit command from the Administrator, through utilities available for that purpose. This has the affect of deleting the logical Strataboard from the Module.

Physical board removal may need to be delayed for some amount of time after the Administrator requests deletion. The Module needs this time to do its internal housekeeping. In fact, it may not be possible in some cases for the Module to do the deletion. The aforementioned utilities must provide for both of these cases.

As implied above in the section "Logical Strataboard Addition," all logical Strataboards are deleted during bootstrap.

8.4 Strataslot States

A slot in the Stratabus can be one of these states:
1. UNDEFINED—nothing is expected in this slot;
2. DEFINED—a particular Strataboard type is expected in this slot;
3. PENDING REMOVAL—the Administrator has asked the Module to delete the logical Strataboard of which the contents of this slot is a member, but the Strataboard occupying the slot has not yet been physically removed.

These states facilitate the method of binding expected Strataslot contents described in the previous section.

8.5 Partner Strataboards

Two Strataboards can be partnered (i.e., synchronized) only if they:
A. are the same model.
B. are the same submodel;
C. have compatible board revisions;
D. have the same firmware revisions;
E. have compatible artwork mask revisions;
F. are in adjacent slots; and
G. the number of the lesser slot is even.

8.6 Logical Strataboard Naming

A logical strataboard will be considered to be located in the even-numbered slot. For example, if initially there was nothing in slots 2 and 3 (the slots' states were UNDEFINED), and a CPU was inserted in slot 3, then a logical CPU is now occupying slot 2. Its physical CPU in slot 2 is considered MISSING.

8.7 Strataslot Constraints

There are several constraints (in addition to those already described) on what combination of Strataboards can be present on a Stratabus.
A. All CPUs must be of the same type.
B. There are disallowed arrangements of CPUs. These are defined by a rather complex algorithm, and are due to underlying constraints on the bus arbitration scheme used in the Stratabus.
C. There are limitations on how far a Memory Strataboard can be from a CPU Strataboard. These are due to fundamental signal propagation limitations of the Stratabus.

The Module will check the Stratabus contents against these constraints both after bootstrap and continuously during Module operation. However, it must be noted that some violations of these constraints will physically prevent the Module from booting. During normal Module operations, violations will occur incrementally with Strataboard insertions, and will be noted at the time of insertion.

8.8 Stratabus Sub-FRUs

The Bus A, Bus B, and Bus sub-FRUs are continually monitored by the Module, for error conditions of various kinds (arbitration, parity, etc.) The Module attempts to recover from these error, but places a limit on the rate of required recovery it will tolerate, beyond which it considers the bus broken.

The Module maintains a maintenance state for each of these sub-FRUs, with the following possible values:
1. MTBF_VIOLATION—the required rate of error recoveries is too great;
2. BROKEN—the sub-FRU has suffered an unrecoverable failure;
3. GOOD—the sub-FRU is in good working order.

It must be understood that certain Strataboard faults masquerade as Bus failures.

These sub-FRUs' maintenance state values are set to GOOD after Module bootstrap. There shall also be an administrative utility which sets their maintenance state to GOOD. This is useful for debugging bus problems caused by a board on the bus.

8.9 Strataboard LEDs

Strataboards have the previously mentioned red light. They also have a green LED, known as the green light. The green light indicates that the partners are synchronized.

9. CPU Features

9.1 CPU Types

This architecture incorporates only the Fresco (G200). The Module will attempt to identify other Stratus CPUs when inserted, and treat then as wrong board insertion errors. However, it is important to note that all Stratus CPUs prior to Fresco will, when inserted, take over the bus and crash the Module. Only the later CPUs (e.g., Kimera) can be benignly inserted.

9.2 CPU Addition

The Module shall incorporate a newly inserted CPU as soon as possible. No Administrator actions (other than inserting the physical boards) shall be required, either before or after.

9.3 CPU Deletion

The Module shall provide a utility for the Administrator to request that a logical CPU be deleted. The Module shall provide a means for telling the Administrator when it is safe to physically remove the CPU boards.

Until a logical CPU is deleted, the Module shall consider any other kind of board present in one of that logical CPUs physical slots to be a wrong board.

9.4 CPU Diagnostics

The CPU diagnostic shall determine the maintenance state of the CPU. The state values are:
A. MISSING—the Strataslot is empty, and the Module expects this slot to be occupied by a CPU;
B. WRONG_BOARD—the Module expects a particular CPU type in this slot, and it is occupied by something else;
C. PARTNER_MISMATCH—the inserted CPU is not compatible with its partner;
D. MODULE_MISMATCH—the Module has already accepted a CPU type which is not compatible with the type just inserted into this slot;
E. CONFIGURATION_VIOLATION—the insertion of a CPU into this slot violates Stratabus electrical constraints;
F. NO_CABLE—the C-connector cable is not attached to the CPU (NOTE: this causes the red light on the CPU to blink);
G. MTBF_VIOLATION—the time rate of transient recoverable failures is too great;
H. TA_MISMATCH—a T/A (Transactional Analysis) logic comparison between partners has failed (this fault is arbitrarily assigned to the partner in the odd-numbered slot, even though the fault may be in either board);
I. BROKEN—the board has suffered an unrecoverable failure;
J. GOOD—the CPU is in good working order.

The CPU diagnostic shall be run
A. after Module bootstrap,
B. during powerfail recovery,
C. on insertion, or
D. whenever a CPU error is detected through hardware self-checking.

Diagnostics are done after bootstrap to determine which CPUs are in working order, prior to using those CPUs.

CPU diagnostics are neither manually nor periodically initiated. This is justified by years of experience with this hardware which show that not only are these features unnecessary, but they actually have undesirable side affects.

This is not to be confused with the "breaker" utility, which randomly forces a Strataboard to appear as if it has suffered a transient failure which triggered its self-checking comparator logic. This is used to simulate an actual board failure, in order to observe how the Module responds.

9.5 No CPU Unfolding

Unfolding means logically reconfiguring two Strataboards which are normally partners, so that they will operate as two independent logical Strataboards.

With CPUs this is technically not feasible. Physical CPUs shall always be dealt with as duplexed pairs (partners) forming a logical CUP.

10. Memory Features

10.1 Memory Types

This architecture incorporates only the Wallaby (M408 or M432). The Module will attempt to identify other Stratus Memories when inserted, and treat them as wrong board insertion errors.

10.2 Memory Addition

The Module shall incorporate a newly inserted Memory as soon as possible. No Administrator actions (other than inserting the physical boards) shall be required, either before or after.

10.3 Memory Deletion

On line Memory deletion is not easily done. Instead, the administrator must shut the Module down, remove the logical Memory, and reboot.

Preferably, the Module could provide a utility for the Administrator to request that a logical Memory be deleted. The Module shall provide a means for telling the Administrator when it is safe to physically remove the Memory boards.

Until a logical Memory is deleted, the Module shall consider any other kind of board present in one of that logical Memory's physical slots to be a wrong board.

It must be made clear to the user that some logical memory cannot be deleted on line. For example, it may not be possible to delete the Memory the kernel resides in.

10.4 Memory Diagnostics

The Memory diagnostic shall determine the maintenance state of the Memory. The state values are:
A. MISSING—the Strataslot is empty, and the Module expects this slot to be occupied by a Memory;
B. WRONG_BOARD—the Module expects a particular Memory type in this slot, and it is occupied by something else;
C. PARTNER_MISMATCH—the inserted Memory is not compatible with its partner;
D. CONFIGURATION_VIOLATION—the insertion of a Memory into this slot violates Stratabus electrical constraints;
E. BROKEN—the board has suffered an unrecoverable failure;
F. MTBF_VIOLATION—the time rate of transient recoverable failure is too great;
G. GOOD—the Memory is in good working order.

The Memory diagnostic shall be run
A. after Module bootstrap,
B. on insertion, or
C. whenever a Memory error is detected through hardware self-checking.

Diagnostics are done after bootstrap to determine which Memories are in working order, prior to using those Memories.

As with CPUs, Memory diagnostics are neither manually nor periodically initiated.

10.5 No Memory Unfolding

Memories shall always be dealt with as duplexed pairs forming a logical Memory. It will not be possible to break a logical Memory into independent simplex Memories.

This feature is technically feasible; however, the implementation is very difficult and prone to error.

11. IOP Features

11.1 IOP Addition

The Module shall incorporate a newly inserted IOP as soon as possible.

However, before the Module can use the logical IOP, the administrator must execute a utility to download firmware into the IOP.

11.2 IOP Addition Scripts

The Module will look for and execute a UNIX shell script upon addition of a logical IOP, if that IOP passes diagnostics.

This script can invoke the firmware download utility introduced in the previous section.

11.3 IOP Deletion

The Module shall provide a utility for the Administrator to request that a logical IOP be deleted. The Module shall provide a means for telling the Administrator when it is safe to physically remove the IOP boards.

The utility for IOP deletion will first delete the adaptors in the PK Chassis on this IOP. And prior to deleting an adaptor, it must delete whatever hangs off each adaptor (such as comm ports and disks). The utility must make it difficult for the Administrator to inadvertently delete something.

Until a logical IOP is deleted, the Module shall consider any other kind of board present in one of that logical IOP's physical slots to be a wrong board.

11.4 IOP Diagnostics

The IOP diagnostic shall determine the maintenance state of the IOP. The state values are:
A. MISSING—the Strataslot is empty, and the Module expects this slot to be occupied by an IOP;
B. WRONG_BOARD—the Module expects a particular IOP type in this slot, and it is occupied by something else;
C. PARTNER_MISMATCH—the inserted IOP is not compatible with its partner;
D. CONFIGURATION_VIOLATION—the insertion of an IOP into this slot violates Stratabus electrical constraints;
E. NO_PK_CHASSIS—the IOP does not have a PK Chassis bus cable plugged into it;
F. NO_FIRMWARE—the IOP has not yet been downloaded;
G. BROKEN—the board has suffered an unrecoverable failure;
H. MTBF_VIOLATION—the time rate of transient recoverable failure is too great;
I. GOOD—the IOP is in good working order.

The IOP diagnostic shall be run
A. after Module bootstrap,
B. on insertion, or
C. whenever an IOP error is detected through hardware self-checking.

Diagnostics are done after bootstrap to determine which IOPs are in working order, prior to using those IOPs.

As with CPUs, IOP diagnostics are neither manually nor periodically initiated.

11.5 IOP RAM Dump

The Module shall provide a utility for transferring the contents of a physical IOP's RAM into a file.

11.6 IOP Failure Script

The Module will look for and execute a UNIX shell script when the value of the maintenance state of an IOP is BROKEN.

This script can invoke the RAM dump utility introduced in the previous section.

11.7 No IOP Unfolding

IOPs shall always be dealt with as duplexed pairs forming a logical IOP. The physical and electrical design of an IOP does not support breaking a logical IOP into independent simplex IOPs.

12. PK Chassis Features

The PK Chassis is a 16 slot I/O card cage and bus, driven by 1 logical IOP. The slots are referred to as PKslots. It holds 14 I/O Adaptors (IOAs) in PKSlots 0 through 13, and requires 2 terminator cards (K108) in PKslots 14 and 15.

The PK Chassis also contains four sub-FRUs: a PK Fan, a P Bus, a Q Bus, and a Power Monitor.

12.1 IOAs

All IOAs operate simplex; there is no use for the term "logical IOA."

12.2 IOA Addition

Initially, a PKslot's contents are undefined. Once an IOA is inserted into such a slot, the Module adds an IOA of that type to itself, and sets the expected contents (see below) of this slot to that type.

Subsequently, physical removals and insertions may occur on this slot. These are represented as various maintenance states of the slot contents.

However, when a Module bootstrap occurs, all memory of expected PSslot contents is lost. The Module then uses the contents of each PKslot as the expected contents of that PKslot.

12.3 IOA Deletion

The expected contents of a PKslot can be cleared only by explicit command from the Administrator, through utilities available for that purpose. This has the effect of deleting the IOA from the Module.

Physical board removal may need to be delayed for some amount of time after the Administrator requests deletion. The Module needs this time to do its internal housekeeping. In fact, it may not be possible in some cases for the Module to do the deletion. For example, it may not be possible to delete the logical Memory containing the OK kernel. The aforementioned utilities must provide for both of these cases.

As implied above in the section "IOA Addition," IOAs are deleted during bootstrap.

12.4 PKslot States

A slot in the PK Chassis can be in one of three states:
1. UNDEFINED—nothing is expected in this slot;
2. DEFINED—a particular IOA type is expected in this slot;
3. PENDING_REMOVAL—the Administrator has asked the Module to delete the IOA in this slot, but the IOA occupying the slot has not yet been physically removed.

These states facilitate the method of binding expected PKslot contents described in the previous section.

12.5 PKslot Constraints

There must be K108 PK terminator cards in PKslots 14 and 15. Otherwise the PK Chassis cannot operate. Indeed, the logical IOP driving the PK Chassis will be diagnosed as NO_PK_CHASSIS.

12.5.1 PK Fan

The PK Chassis contains a PK Fan Sub-FRU. This is actually composed of several fans; however, they are inserted and removed as a single FRU. The Module continuously monitors the maintenance state of the PK Fan:
1. BROKEN—one or more of the fans is not working;
2. GOOD—all fans are in good working order.

12.5.2 P Bus and Q Bus

The PK Chassis provides a fault-tolerance connection between a logical IOP and the IOAs, in the form of two redundant buses, the P Bus and Q bus sub-FRUs.

The P Bus and Q Bus sub-FRUs are continually monitored by the Module for error conditions. The Module attempts to recover from these errors, but places a limit on the rate of required recovery it will tolerate, beyond which it considers the bus broken.

The Module maintains a maintenance state for each of these sub-FRUs, with the following possible values:
1. MTBF_Violation—the required rate of error recoveries is too great;
2. BROKEN—the sub-FRU has suffered an unrecoverable failure;
3. GOOD—the sub-FRU is in good working order.

It must be understood that certain IOA and IOP faults masquerade as P and Q Bus failures.

These sub-FRUs' maintenance state values are set to GOOD after Module bootstrap. These shall also be an administrative utility to set their maintenance states to GOOD. This is useful for debugging bus problems caused by a board on the bus.

12.6 PK54 Power Monitor

This sub-FRU provides power status for the PK54 Expansion Chassis the PK Chassis is mounted in. It has the following state values:
1. NOT_PK54—this PK Chassis is not mounted in a PK54 Cabinet;
2. CHASSIS_1—this PK Chassis is the first in the PK54 Cabinet, power is GOOD;
3. CHASSIS_NOT_1—this PK Chassis is not the first in the PK54 Cabinet, power is GOOD;
4. CHARGING—the battery is charging; a power failure now may not be recoverable;
5. AC-FAIL—the AC Controller has failed
6. DC-FAIL—the DC supply has failed;
7. POWER_CTL_FAIL—the power controller has failed;
8. POWER FAIL—general power failure.

13. K105 Disk IOA Features

The K105 IOA drives one Disk Drawer: a D202, D203, or D205.

13.1 K105 Addition

The Module shall incorporate a newly inserted K105 as soon as possible. No Administrator actions (other than inserting the physical boards) shall be required, either before or after.

13.2 K105 Deletion

The module shall provide a utility for the Administrator to request that a K105 be deleted. The Module shall provide a means for telling the Administrator when it is safe to physically remove the K105 board.

Until a K105 is deleted, the Module shall consider any other kind of board present in that K105's physical slot to be a wrong board.

13.3 K105 Diagnostics

The K105 diagnostic shall determine the maintenance state of the K105. The state values are:

A. MISSING—the PKslot is empty, and the Module expects this slot to be occupied by a K105;

B. WRONG BOARD—the Module expects a particular K105 type in this slot, and it is occupied by something else;

C. MTBF_VIOLATION—the time rate of transient recoverable failures is too great;

D. BROKEN—the board has suffered an unrecoverable failure;

E. GOOD—the K105 is in good working order.

The K105 diagnostic shall be run
  A. after Module bootstrap,
  B. during powerfail recovery,
  C. on insertion, or
  D. whenever a K105 error is detected.

K105 diagnostics are neither manually nor periodically initiated.

13.4 Disk Drawer Slot

The K105 contains a slot into which a Disk Drawer can be plugged. This slot can be in one of three states:

1. UNDEFINED—nothing is expected in this slot;
2. DEFINED—a particular Disk Drawer type is expected in this slot;
3. PENDING_REMOVAL—the Administrator has asked the Module to delete the Disk Drawer in the slot, but the Disk Drawer occupying the slot has not yet been removed.

After Module bootstrap all memory of the expected contents of a Disk Drawer slot is lost. The Module then uses the contents of the slot as its expected contents.

14. Disk Drawer Features

The D202, D203, and D205 Disk Drawers contain a disk drive, the disk media, and a slot for a Disk Fan.

14.1 Disk Drawer Addition

The Module shall incorporate a newly inserted Disk Drawer as soon as possible. The administrator must run utilities to do physical sectoring and establish label information on the disk media.

Upon insertion the Module shall diagnose both the drive and the media.

14.2 Disk Drawer Formatting

The Module shall provide the Administrator utilities for formatting the media of a Disk Drawer. Formatting shall perform the following:

1. physical sectoring;
2. labelling;
3. place disk geometry information in label;
4. translate the manufacturer's bad block information into a bad block table;
5. write the Disk Drawer model number into the label.
6. write the Disk Drawer serial number into the label.

14.3 Disk Drawer Deletion

The Module shall provide a utility for the Administrator to request that a Disk Drawer be deleted. The Module shall provide a means for telling the Administrator when it is safe to physically remove the Disk Drawer.

14.4 Disk Drawer Diagnostics

The Disk Drawer diagnostic shall determine the maintenance state of the Disk Drawer. The states values are:

A. MISSING—the K105 Disk Drawer slot is empty, and the Module expects it to be occupied;

B. SPINUP_FAILURE—the drive has failed to bring the disk media up to speed;

C. BROKEN_1—the Module fails first-level diagnostics (can't do the primitive disk I/O necessary to format the media or check if already formatted);

D. UNSECTORED—the disk media is not physically sectored (via the format utility);

E. BROKEN_2—the Disk Drawer fails second-level diagnostics;

F. NO_LABEL—the label has not been written to the media;

G. FOREIGN—the label is not an FTX label;

H. BROKEN_3—the Disk Drawer fails third-level diagnostics;

I. BBT_FULL—the bad block table is full;

J. GOOD—the Disk Drawer is valid and in good working order.

The Disk Drawer diagnostic shall be run
  A. after Module bootstrap,
  B. during powerfail recovery,
  C. on insertion, and
  D. periodically when necessary.

As implied by the Disk Drawer maintenance state values, the thoroughness of the diagnostics depends upon disk administration. For example, if the disk has not yet been formatted, only first-level diagnostics can be performed. Once the Administrator has formatted the Disk Drawer, diagnosis will proceed to the next level.

Disk Drawer diagnostics are not manually initiated.

15. Disk Fan

The Disk Drawer contains a slot for a Disk-Fan FRU. The Module continuously monitors the maintenance state of the Disk Fan:

1. BROKEN—the Disk Fan is missing or has failed or is obstructed.
2. GOOD—the Disk Fan is present and in good working order.

16. K101 Full Modem ACOMM IOA Features

The K101 IOA is a synchronous/asynchronous programmable communications board. It drives up to four communications lines.

It requires protocol-defining firmware to be downloaded prior to operation.

16.1 K101 Addition

The Module shall incorporate a newly inserted K101 as soon as possible.

However, before the Module can use the K101, the administrator must execute a utility to download its firmware.

16.2 K101 Addition Scripts

The Module will look for and execute a UNIX shell script for a K101 upon addition, if the K101 passes diagnostics.

The script can invoke the firmware download utility introduced in the previous section.

16.3 K101 Deletion

The Module shall provide a utility for the Administrator to request a K101 be deleted. The Module shall provide a means for telling the Administrator when it is safe to physically remove the K101 board.

Until a K101 is deleted, the Module shall consider any other kind of board present in that K101's physical slow to be a wrong board.

16.4 K101 Diagnostics

The K101 diagnostic shall determine the maintenance state of the K101. The state values are:

A. MISSING—the PKslot is empty, and the Module expects this slot to be occupied by a K101;

B. WRONG_BOARD—the Module expects a particular K101 type in this slot, and it is occupied by something else;

C. NO_FIRMWARE—the K101 has not yet been downloaded;

D. MTBF_VIOLATION—the time rate of transient recoverable failure is too great;

E. BROKEN—the board has suffered an unrecoverable failure;

F. GOOD—the K101 is in good working order.

The K101 diagnostic shall be run
A. after Module bootstrap,
B. during powerfail recovery,
C. on insertion, and
D. whenever a K101 error is detected.

K101 diagnostics are neither manually nor periodically initiated.

16.5 K101 RAM Dump

The Module shall provide a utility for transferring the contents of a K101's RAM into a file.

16.6 K101 Failure Script

The Module will look for and excuse a UNIX shell script when the value of the maintenance state of an K101 becomes BROKEN.

This script can invoke the RAM dump utility introduced in the previous section.

16.7 K101 Sub-FRUs

Each of the four ports of the K101 is considered a sub-FRU. The Module maintains a maintenance state for each of these sub-FRUs, with the following possible values:

E. BROKEN—the sub-FRU has suffered an unrecoverable failure;

F. GOOD—the sub-FRU is in good working order.

17. Kill Null Modem ACOMM IOA Features

The K111 feature set is identical to the K101.

18. K102, K109, and HIF UCOMM IOA Features

From a maintenance point of view those IOAs are identical to the K101, except they have only two ports.

19. K103 CCOMM IOA

The K103 IOA contains a null modem asynchronous communications port, a full modem asynchronous communications port, and a non-volatile calendar-clock. These are treated as sub-FRUs. The maintenance states of the K103 and its sub-FRUs are identical to those of the K101, except it contains three rather than four sub-FRUs.

The K103 Null Modem Port is intended to be used for the Module Console. The K103 Modem Port is intended to be used for the RSN.

20. K106 Cartridge Tape IOA Features

The K106 maintenance states are identical to those of the K105 disk IOA, with one exception. While there is a slot for the tape drive, there is no state associated with the slot. The maintenance state of the FRU that plugs into this slot (Cartridge Tape Drive) is sufficient.

21. Cartridge Tape Drive

The maintenance state of this FRU keeps track both of the drive and the FRU in that drive.

1. MISSING—the Tape Drive is not attached to the K106.

2. NO_MEDIA—the Tape Drive is attached, but there is no cartridge present.

3. MEDIA_PRESENT—the Tape Drive is attached, and there is a cartridge present.

As with a K101 Port, the Module needs to know the dev t value to associate with the Drive. It will look for this in the same manner as described for K101 Ports.

22. K107 9 Track Tape IOA

The K107 is treated in the same manner as the K106 Cartridge Tape IOA.

23. 9 Track Tape Drive

This FRU is treated in the same manner as the Cartridge Tape Drive.

24. K104 Ethernet IOA

The FRU is treated in the same manner as the K101 FRU. However, it has no sub-FRUs.

25. K108 Terminator Features

The last two slots in a PK Chassis (14 and must contain K108s. These monitor power and PK Bus status. The Module continuously monitors the maintenance state of each K108, which can have the following values:

1. MISSING
2. BROKEN
3. GOOD

26. Front Panel Maintenance Indicators

The main cabinet has a front panel. It contains an LCD unit, a Module red light, and a Module green light.

26.1 LCD Display Unit

A single line Liquid Crystal Display unit (LCD) is mounted on the front of the main cabinet. The LCD will display a list of messages, one for each FRU whose maintenance state value is BROKEN.

The LCD overcomes its single line handicap by displaying each individual message for a short period of time, then moving on to the next, and starting over when it reaches the end of the list.

26.2 Module Green Light

The Module green light will be on as long as the Module is running. More specifically, the Module green light will illuminate as long as one or more of the CPUs in the system: a) is on line, b) has a good Bulk Power Drawer, and c) has strobed its green light control within the last two seconds. That is, the green light will be on if at least one CPU is operating.

26.3 Module Red Light

The Module red light will illuminate when there are one or more problems in the Module, such as bad FRU, or the Module is not running.

Note that it is possible for both the Module Red Light and the Module Green Light to be on at the same time. This says one or more FRUs are broken, but the Module is still running.

Variations on the preferred embodiment described above, which is just illustrative of the invention, will occur to those skilled in the art and are intended to fall within the scope of the invention as defined by the following claims.

What is claimed is:

1. In a digital data processor of the type having processing means for processing data including one or more functional units operatively interconnected along a bus, said functional units including any of processing units, memory assemblies, peripheral devices, peripheral device controllers and the like,
   - the improvement wherein said processing means includes state machine means for providing a maintenance state model of said digital data processor, said state machine means including a plurality of state managers each associated with one of said functional units for indicating the state thereof,
   - said processing means including event signalling means coupled to said state machine means for generating event messages indicative of conditions of said digital data processor,
   - at least a first said state manager being selectively responsive to any of said event messages and a state indicated by another state manager to change the state indicated by said first state manager.

2. In a digital data processor according to claim 1 the improvement wherein said processing means includes scheduling means responsive to a request for at least one of (a) processing said event messages and (b) scheduling evaluation of a state manager's maintenance state.

3. In a digital data processor according to claim 2, the improvement wherein said scheduling means includes means for evaluating a state manager's maintenance state by executing the steps of (a) evaluating a predetermined input condition, (b) selectively making a state transition in accord with that input condition and with the state manager's maintenance state, and (c) selectively performing a predetermined action associated with said transition.

4. In a digital data processor according to claim 3 the improvement wherein processing means includes message handling means coupled to said event signalling means and to said state machine means for, alternately, (a) generating requests for processing of all pending event messages and (b) generating a request for evaluation of one state manager's maintenance state.

5. In a digital data processor according to claim 4 the improvement wherein said message handling means includes means for, repeatedly and alternately, executing the steps of (a) generating requests for processing of all pending event messages and (b) generating a request for evaluation of at most one state transition of one state manager's maintenance state.

6. In a digital data processor according to claim 4 the improvement wherein said scheduling means is arranged to schedule evaluation of respective state managers' maintenance states according to a priority determined by (a) dependencies between state managers, wherein one state manager can mark itself dependent on another state manager, and (b) priorities set by scheduling conditions registered by state managers.

7. In a digital data processor according to claim 1 the improvement wherein said state managers are configured to represent a configuration of said digital data processor.

8. In a digital data processor according to claim 1, the improvement wherein said processing means operates under a UNIX-type operating system.

9. In a digital data processor of the type having processing means for processing data, including one or more functional units operatively interconnected along a bus, said functional units including any of processing units, memory assemblies, peripheral devices, peripheral device controllers and the like, the improvement wherein said processing means includes event signalling means for generating event messages indicative of conditions of said digital data processor, and state machine means for providing a maintenance state model of said digital data processor, said state machine means including
   - A. a plurality of state managers each associated with one of said functional units for indicating the state thereof,
   - B. said state managers being configured to represent a configuration of said digital data processor,
   - C. message handling means for, alternately, (a) generating requests for processing of all pending event messages awaiting processing, and (b) generating a request for evaluation of one state manager's maintenance state,
   - D. scheduling means responsive to said requests for selectively processing said event messages and for scheduling evaluation of a state manager's maintenance state, said scheduling means arranged to schedule evaluation of respective state managers' maintenance states according to a priority determined by (a) dependencies between state managers, wherein one state manager can mark itself dependent on another state manager, and (b) priorities set by scheduling conditions registered by state managers.

10. In a digital data processor according to claim 9, the further improvement wherein said scheduling means includes means for executing the steps of (a) evaluating a predetermined input condition, (b) selectively making a state transition in accord with that input condition and the state manager's maintenance state, and (c) selectively performing a predetermined action associated with said transition.

* * * * *